United States Patent
Cooper et al.

(10) Patent No.: US 11,719,929 B2
(45) Date of Patent: Aug. 8, 2023

(54) OPTICAL TRAINS FOR IMAGING SYSTEMS AND SPECTRAL EDGE DETECTION

(71) Applicant: RareCyte, Inc., Seattle, WA (US)

(72) Inventors: Jeremy Ryan Cooper, North Bend, WA (US); David Stewart, Seattle, WA (US)

(73) Assignee: RareCyte, Inc., Seattle, WA (US)

( * ) Notice: Subject to any disclaimer, the term of this patent is extended or adjusted under 35 U.S.C. 154(b) by 164 days.

(21) Appl. No.: 17/132,998

(22) Filed: Dec. 23, 2020

(65) Prior Publication Data

US 2021/0311302 A1 Oct. 7, 2021

Related U.S. Application Data

(60) Provisional application No. 63/005,932, filed on Apr. 6, 2020.

(51) Int. Cl.
| | |
|---|---|
| *G02B 27/00* | (2006.01) |
| *G01N 21/64* | (2006.01) |
| *G02B 21/16* | (2006.01) |
| *G02B 5/28* | (2006.01) |
| *G02B 7/00* | (2021.01) |

(52) U.S. Cl.
CPC ..... *G02B 27/0025* (2013.01); *G01N 21/6458* (2013.01); *G02B 5/28* (2013.01); *G02B 7/006* (2013.01); *G02B 21/16* (2013.01); *G01N 2021/6465* (2013.01); *G01N 2021/6471* (2013.01); *G01N 2021/6478* (2013.01)

(58) Field of Classification Search
CPC ...... G02B 27/0025; G02B 5/28; G02B 7/006; G02B 21/16; G02B 27/005; G02B 27/0068; G02B 27/0075; G02B 21/00; G02B 21/0004; G02B 21/002; G02B 21/0032; G02B 21/006; G02B 21/0076; G02B 21/36; G02B 21/361; G01N 21/6458; G01N 2021/6456; G01N 2021/6471; G01N 2021/6478; G01N 2021/6463; G01N 21/6456; G01N 21/6486
USPC ....... 359/368, 362, 363, 369, 385, 388, 577, 359/578, 580, 589, 590
See application file for complete search history.

(56) References Cited

U.S. PATENT DOCUMENTS

| | | | |
|---|---|---|---|
| 8,330,087 B2 | 12/2012 | Domenicali | |
| 9,442,013 B2* | 9/2016 | Iga | G01J 3/26 |
| 10,345,237 B1 | 7/2019 | Cooper | |
| 10,371,634 B2 | 8/2019 | Rothberg et al. | |
| 2014/0246624 A1 | 9/2014 | Seubert et al. | |
| 2016/0154236 A1 | 6/2016 | Siebenmorgen et al. | |
| 2017/0343825 A1* | 11/2017 | Sinha | G01J 3/02 |

FOREIGN PATENT DOCUMENTS

WO    WO2017144442 A1    8/2017

OTHER PUBLICATIONS

Neil Anderson, Robert Beeson, Turan Erdogan, 'Angle-Tuned Thin-Film Interference Filters for Spectral Imaging', OSA Optics and Photonics News, Jan. 2011. (Year: 2011).*

* cited by examiner

*Primary Examiner* — Arnel C Lavarias
(74) *Attorney, Agent, or Firm* — Shay Glenn LLP

(57) ABSTRACT

Disclosed are optical trains for imaging systems. More particularly described are imaging systems configured to limit optical aberrations. Also disclosed are methods of limiting optical aberrations in imaging systems.

19 Claims, 18 Drawing Sheets

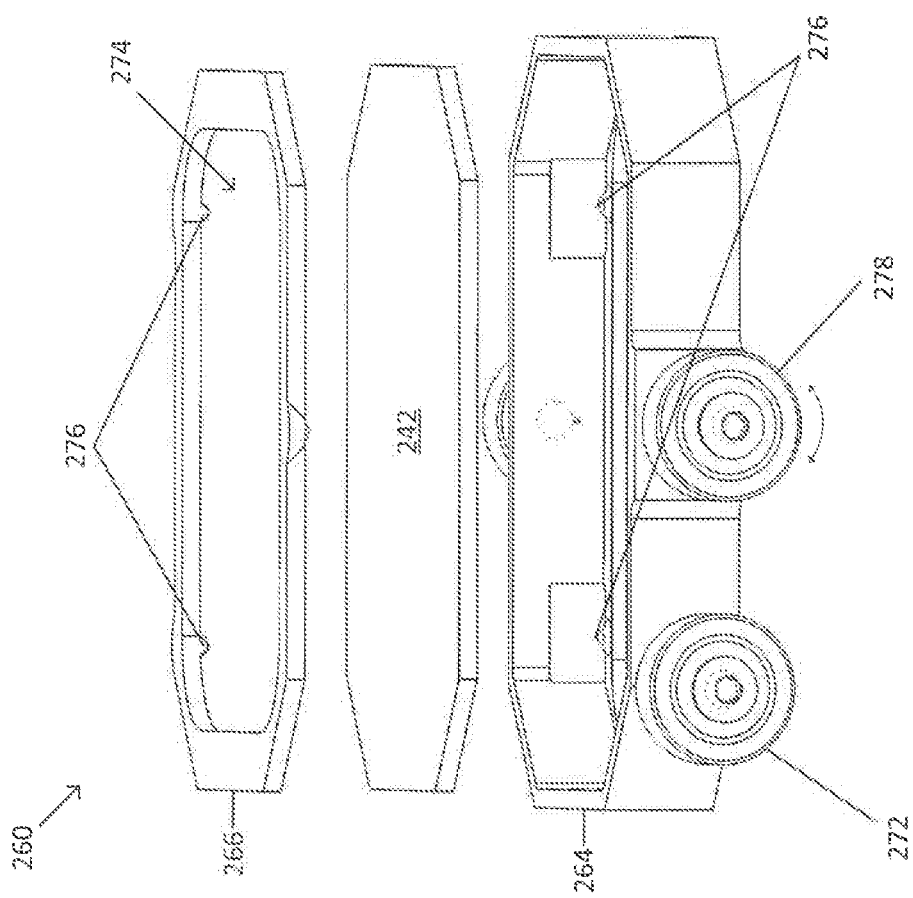

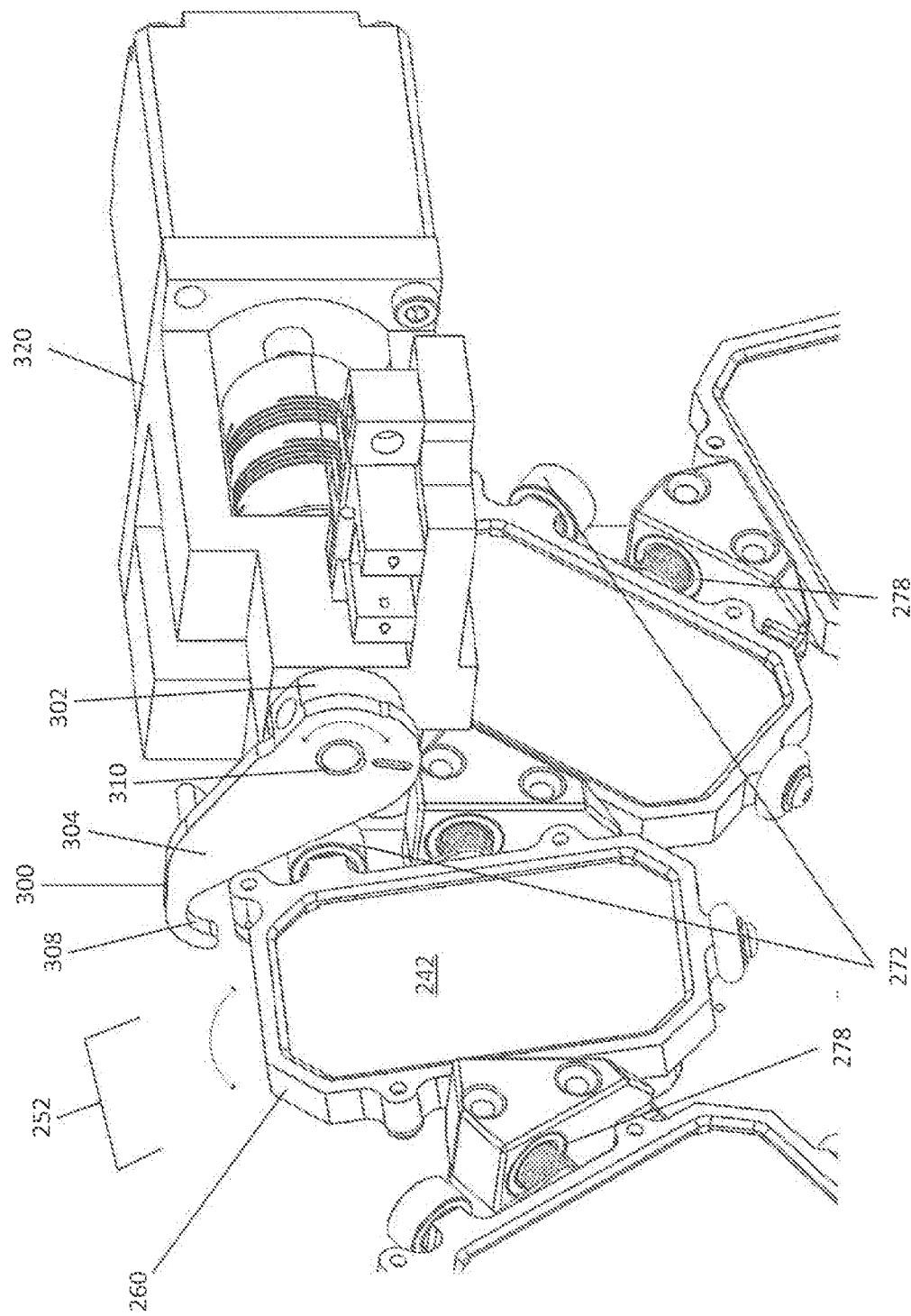

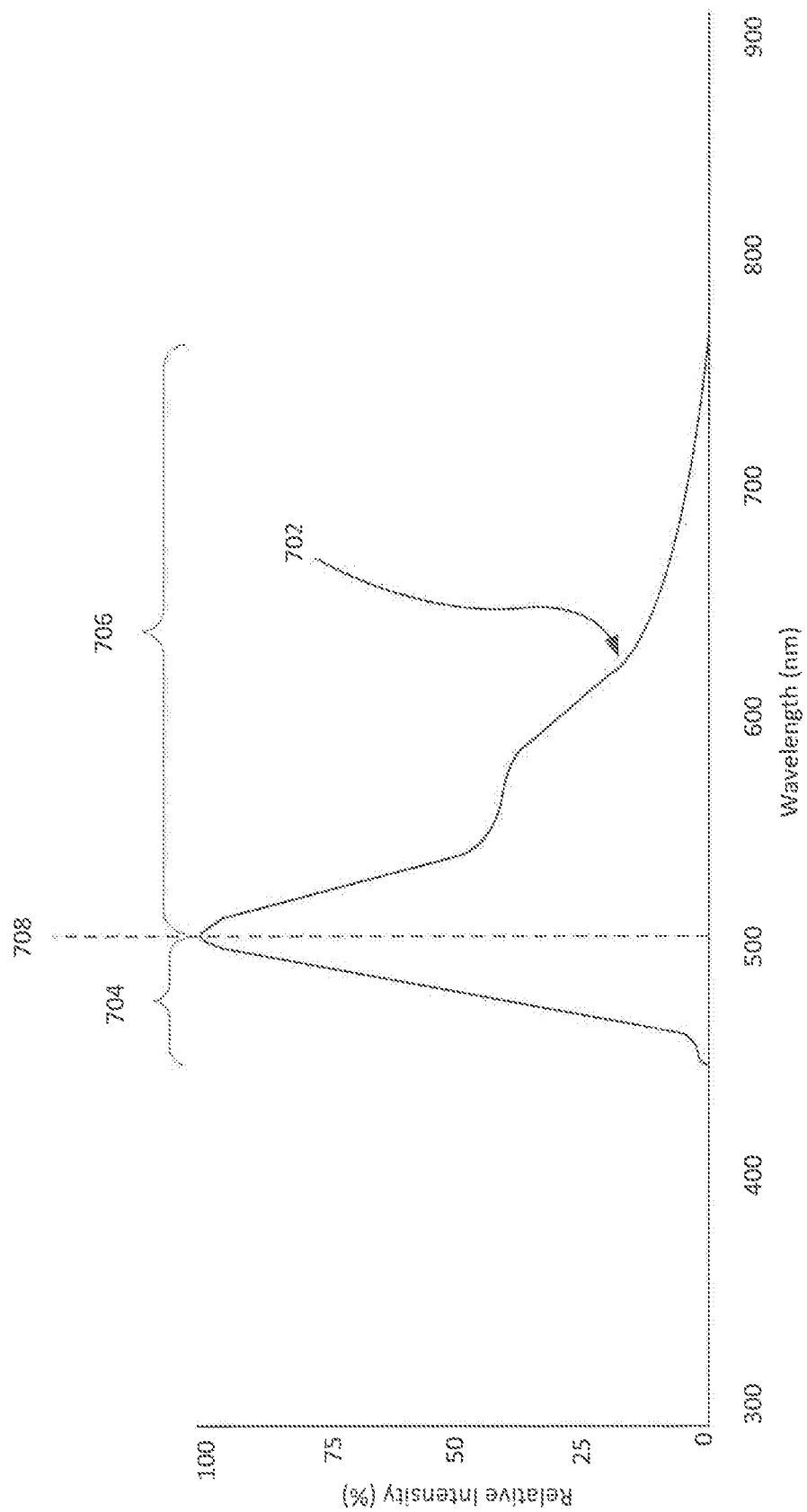

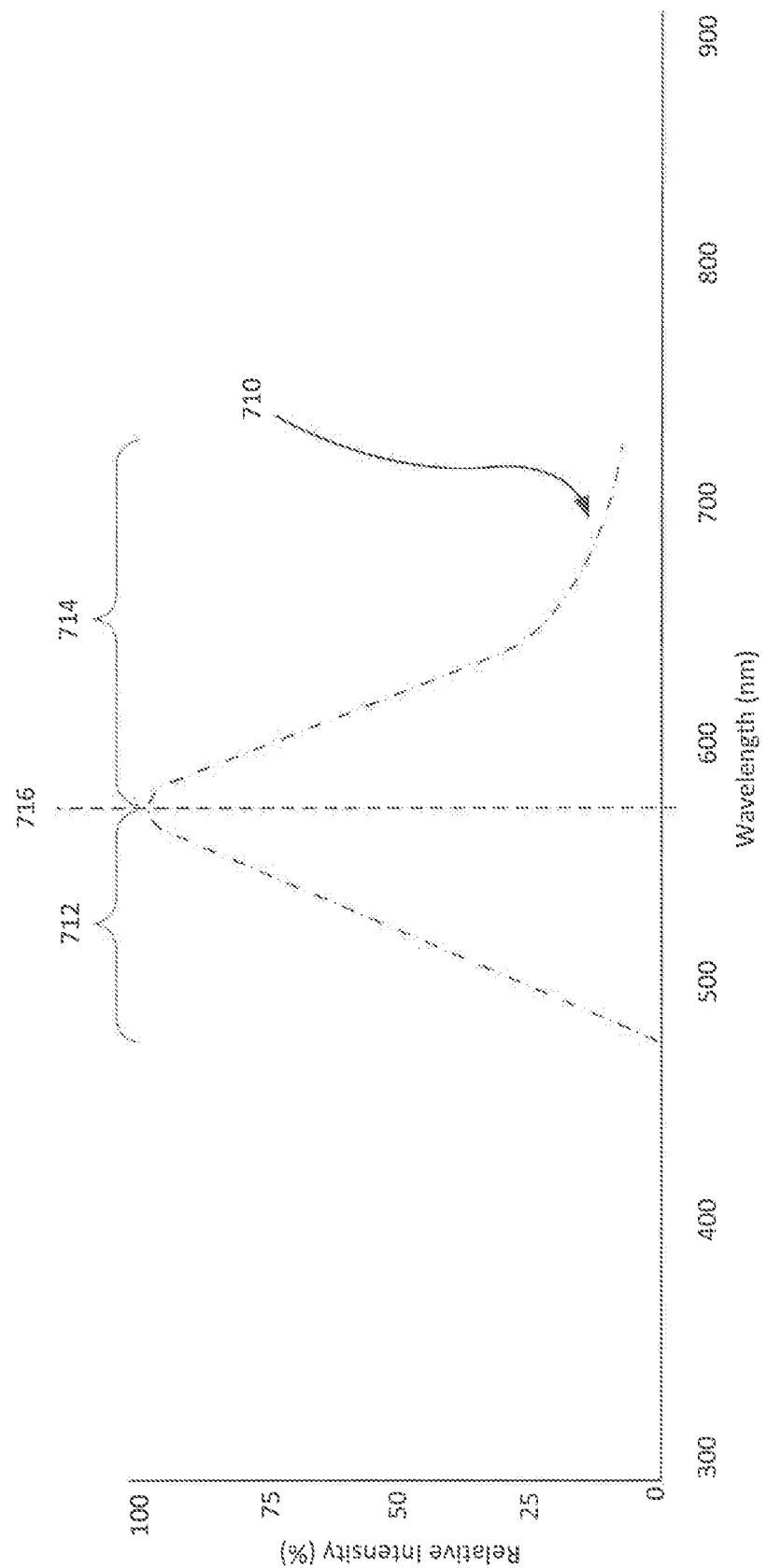

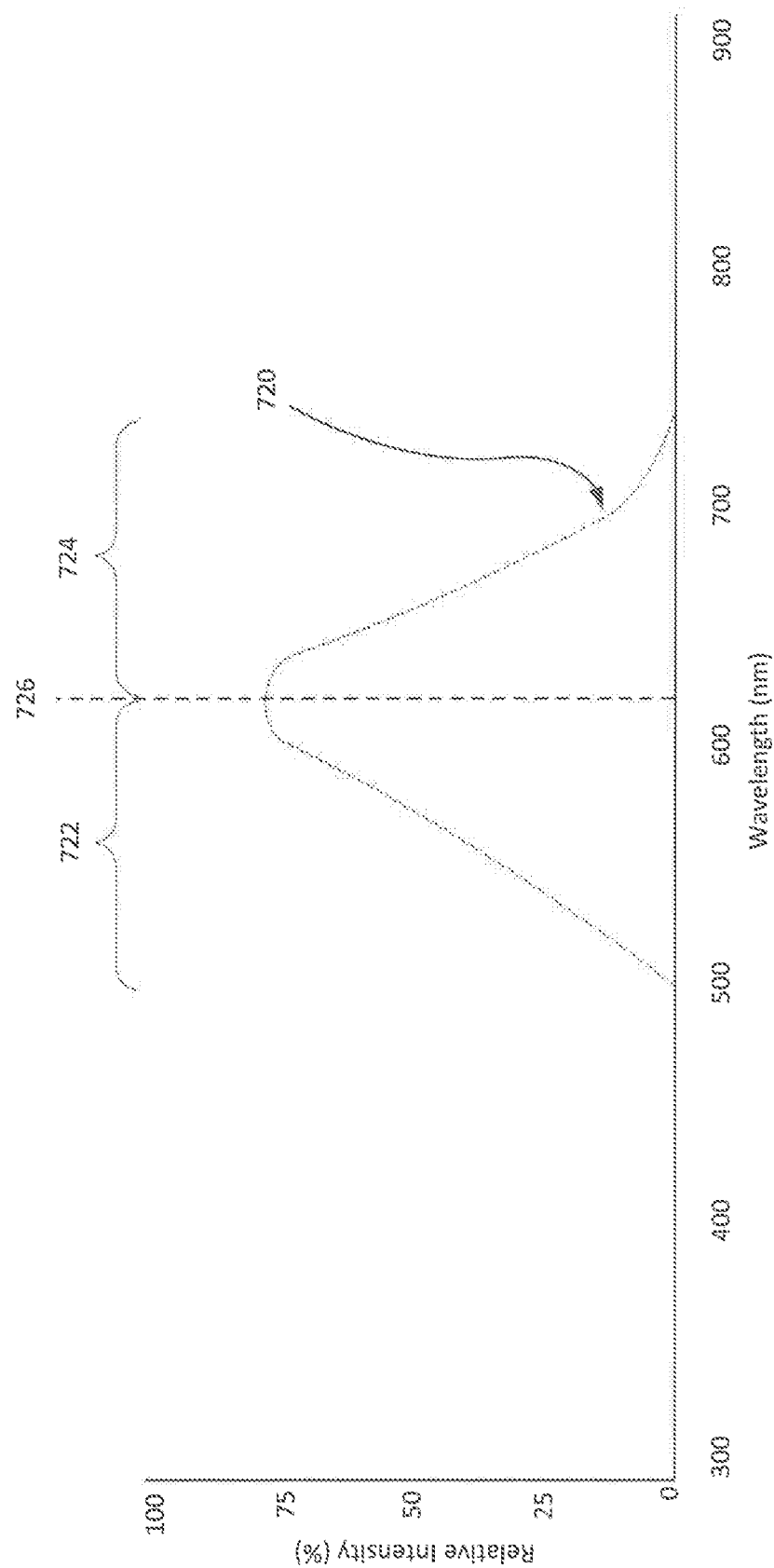

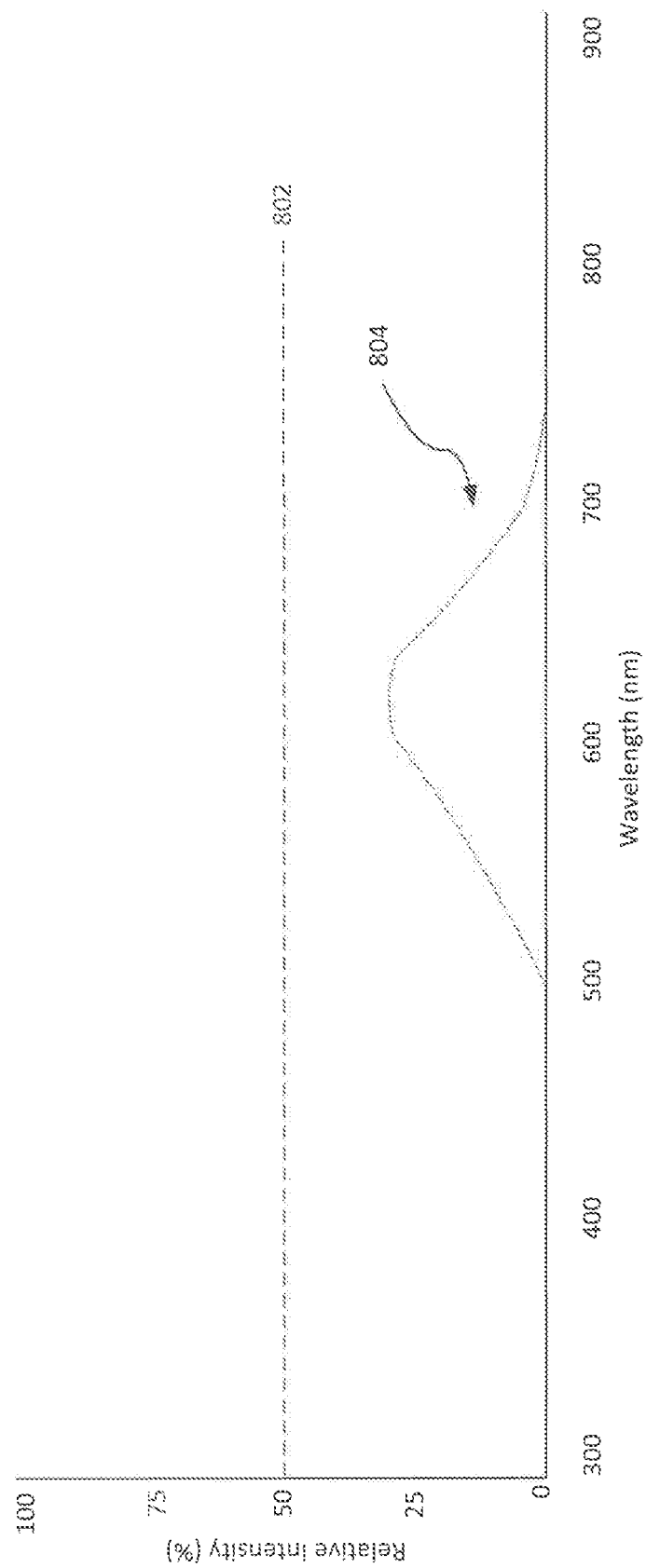

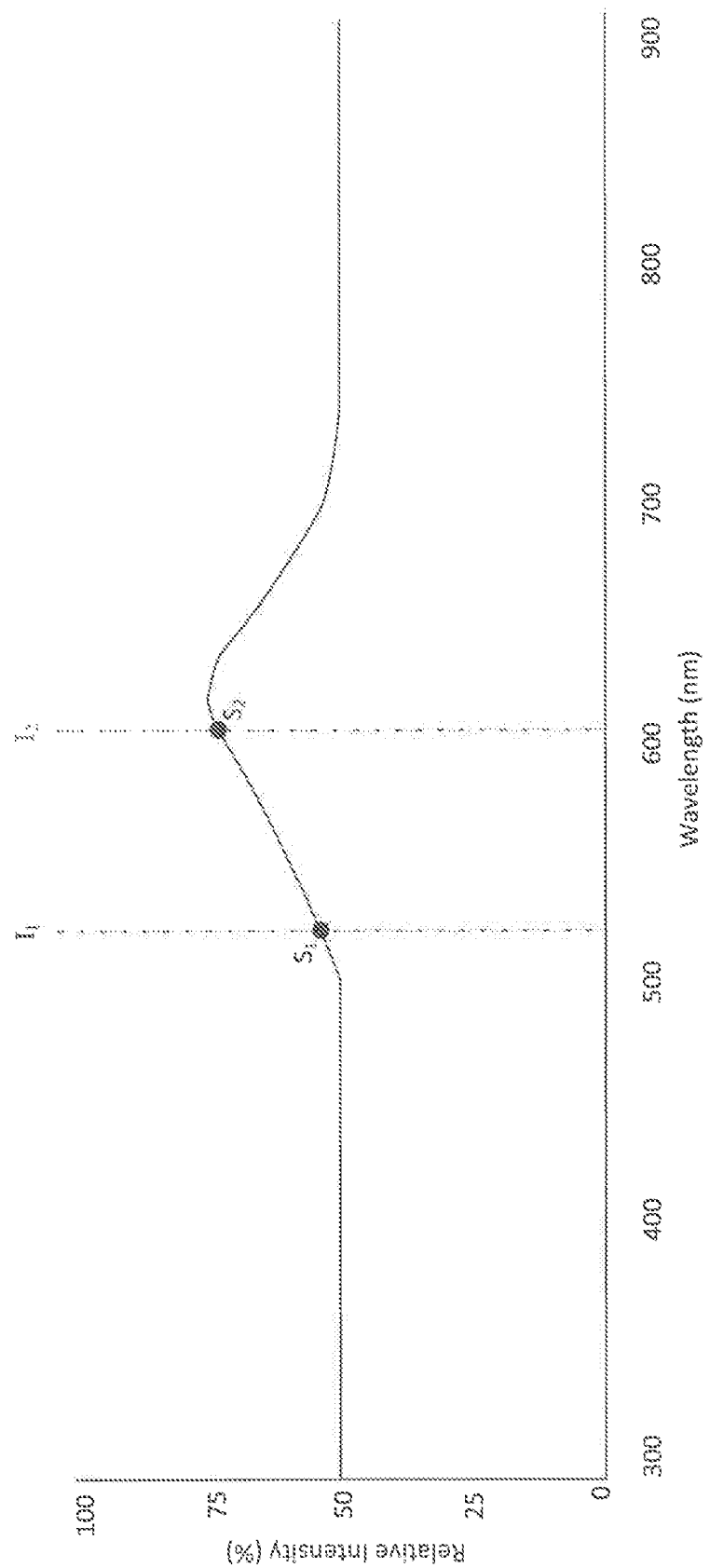

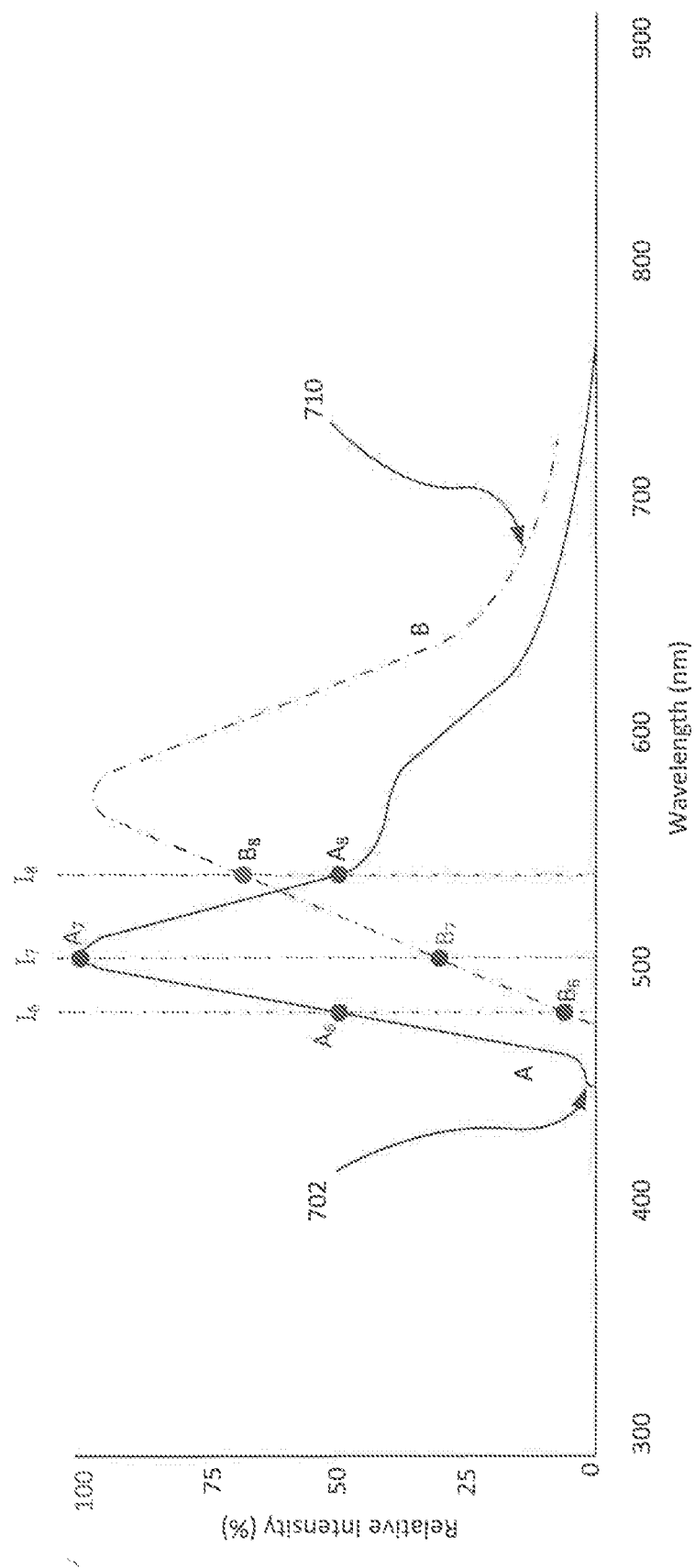

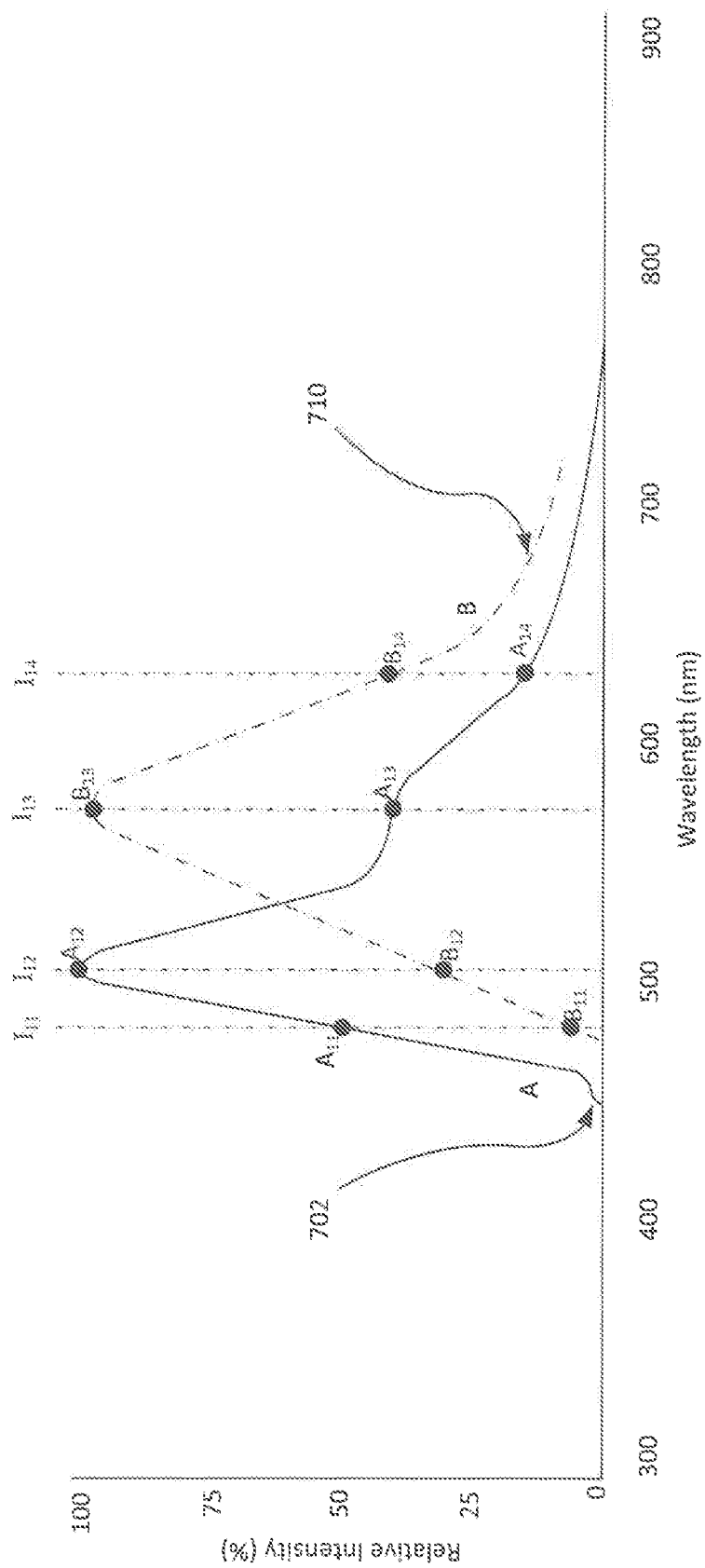

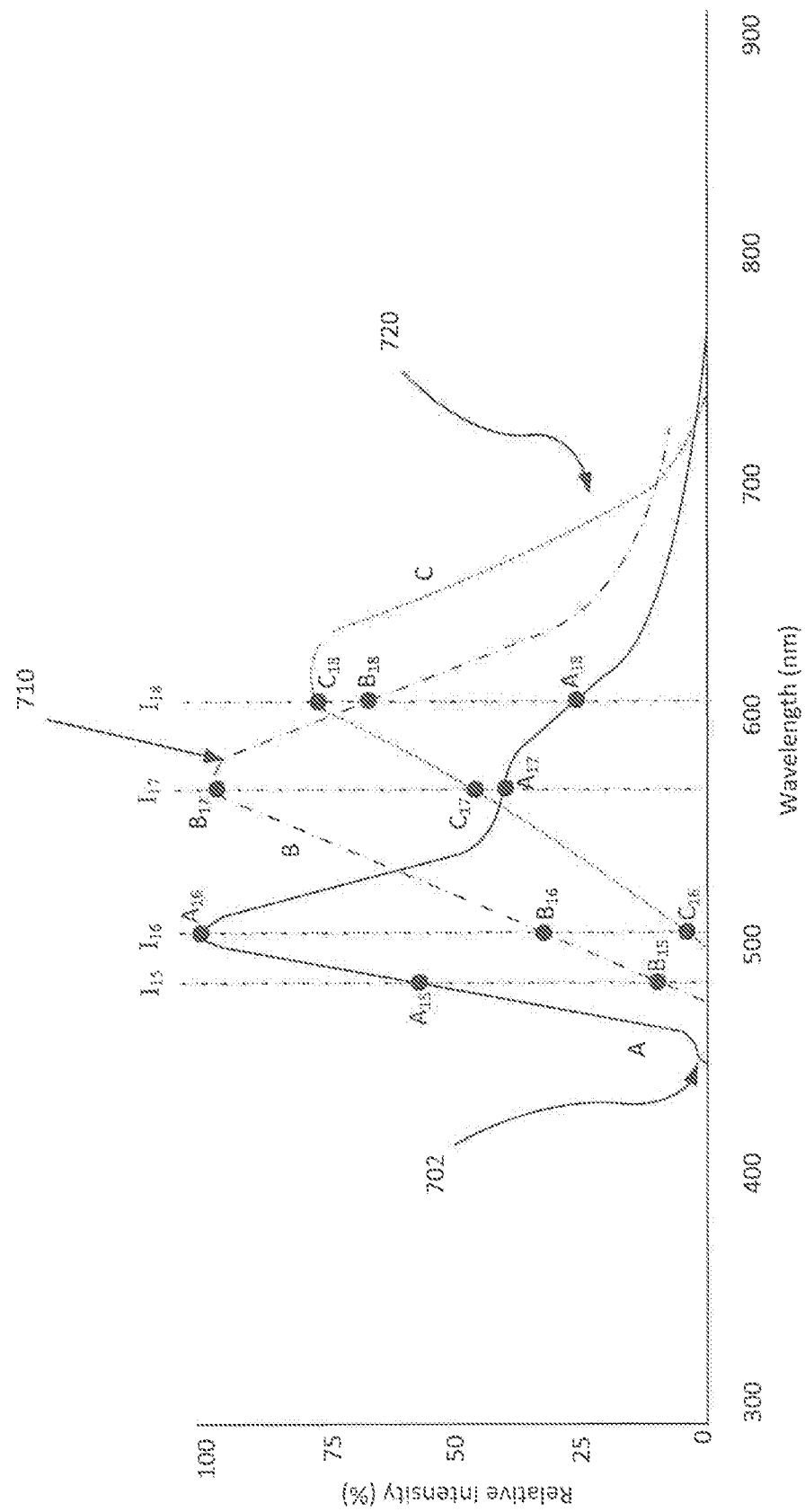

OPTICAL TRAINS FOR IMAGING SYSTEMS AND SPECTRAL EDGE DETECTION

CROSS REFERENCE TO RELATED APPLICATIONS

This application claims the benefit of priority of U.S. Provisional Application No. 63/005,932 filed Apr. 6, 2020, which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

FIELD

This disclosure relates generally to microscopic imaging systems for the analysis of samples. More particularly, this disclosure relates to mitigating optical aberrations of imaging systems for fluorescence microscopy. Furthermore, this disclosure relates to optical trains for automated high throughput imaging systems. Additionally, this disclosure relates to methods and imaging systems for sequentially detecting multiple detection moieties.

BACKGROUND

Microscopy is a powerful technology that is used to examine and image inorganic and organic samples. Selected samples may include biological samples having one or more biomarkers or components that may be targeted for detection or imaging. Current optical train filters and imaging systems used in microscopy may only permit a limited number of labels to be used at any one given time. Furthermore, imaging systems can suffer from image quality issues such as aberrations, astigmatism, focal shift and image shift, etc. As a result, practitioners, researchers, and microscopists continue to seek systems and methods to more efficiently and accurately image samples.

SUMMARY

In a first aspect, embodiments of an imaging system are provided. The imaging system comprises at least one tiltable filter assembly comprising an optical filter configured to be positioned in the optical path of the imaging system, a dynamic correction optic configured to be positioned in the optical path of the imaging system, and a fixed correction optic configured to be positioned in the optical path of the imaging system.

The imaging system can comprise a telecentric tube lens configured to be positioned in the optical path of the imaging system.

In some embodiments, the fixed correction optic is configured to substantially mitigate an astigmatism caused by the combination of the optical filter and the dynamic correction optic.

Any residual astigmatism caused by the combination of the fixed correction optic, the dynamic correction optic, and the optical filter can be approximately zero (0).

In some embodiments, for a selected first angle of incidence of the optical filter, the dynamic correction optic is configured to be tilted to a second angle of incidence, and wherein the angle of incidence of the fixed correction optic is configured to create an astigmatism to substantially mitigate the astigmatism caused by the combination of the optical filter at the selected first angle of incidence and the dynamic correction optic at the second angle of incidence. The dynamic correction optic can be configured to substantially stabilize a lateral image shift caused by a tilting of the optical filter. In some embodiments, a sum of a lateral image shift caused by the dynamic correction optic and the lateral image shift caused by a tilting of the optical filter is approximately constant. For a selected first angle of incidence of the optical filter, the dynamic correction optic can be configured to be tilted to a second angle of incidence, and wherein a sum of a lateral image shift caused by the dynamic correction optic and the lateral image shift caused by the optical filter is approximately constant.

In some embodiments, the optical filter held by the at least one tiltable filter assembly, and the dynamic correction optic, are configured to tilt on approximately parallel X-axes, and wherein the fixed correction optic is tilted on a substantially perpendicular Y-axis. The telecentric tube lens can be located in the optical path of the imaging system at a position where the telecentric tube lens is telecentric in both image and object space.

In some embodiments, the system comprises a filter changer configured to hold the at least one tiltable filter assembly. The filter changer can be a filter wheel, and the at least one tiltable filter assembly can be configured to tilt the optical filter to an angle of incidence selected from a range of approximately 0° to 89.9°. In some embodiments, the filter changer comprises at least 2, 3, 4, 5, 6, 7, 8, 9, 10, 11, 12, 13, 14, 15, 16, 17, 18, 19 or 20 tiltable filter assemblies.

In some embodiments, the system comprises a low incidence filter selected from at least one of the group consisting of a dichroic filter, a polychroic filter, a shortpass filter, a longpass filter, a bandpass filter, a bandstop filter, and a multi-pass filter, wherein the low incidence filter is configured to have an angle of incidence with an excitation light selected from an angle ranging from approximately 10.0° to 30.0°. The low incidence filter can be a polychroic filter.

In some embodiments, the imaging system is a fluorescence microscope imaging system.

The optical filter can be an interference filter.

In some embodiments, the at least one tiltable filter assembly is configured to tilt the optical filter to an angle of incidence selected from a range of approximately 0° to 89.9°.

In another aspect, a method of mitigating astigmatism in an imaging system is provided. The method comprises positioning an optical filter in an optical path of the imaging system at a first angle of incidence; positioning a dynamic correction optic in the optical path of the imaging system at a second angle of incidence; positioning a fixed correction optic in the optical path of the imaging system at a third angle of incidence; wherein the angle of incidence of the fixed correction optic is configured to create an astigmatism to substantially mitigate the combined astigmatism of the optical filter, at the first angle of incidence, and the astigmatism of the dynamic correction optic, at the second angle of incidence.

In yet another aspect, a method of stabilizing a lateral image shift in an imaging system is provided. The method comprises positioning an optical filter in an optical path of the imaging system at a first angle of incidence; positioning a dynamic correction optic in the optical path of the imaging system at a second angle of incidence; wherein the dynamic correction optic is configured to substantially stabilize a lateral image shift caused by a tilting of the optical filter.

BRIEF DESCRIPTION OF THE DRAWINGS

FIG. 2B is a perspective view of one embodiment of a filter assembly.

FIG. 3 is a perspective view of one embodiment of a filter assembly, a cam, and a motor.

FIG. 7A is a graph showing an emission spectrum of a first detection moiety.

FIG. 7B is a graph showing an emission spectrum of a second detection moiety.

FIG. 7C is a graph showing an emission spectrum of a third detection moiety.

FIG. 8A is a graph showing an emission spectrum and background signal.

FIG. 8B a signal obtained during imaging.

FIGS. 9A-9D are graphs showing emission spectra and imaging of a first and second detection moiety.

FIG. 9E is a graph showing emission spectra and imaging of a first, second, and third detection moiety.

DETAILED DESCRIPTION

Figure 1:
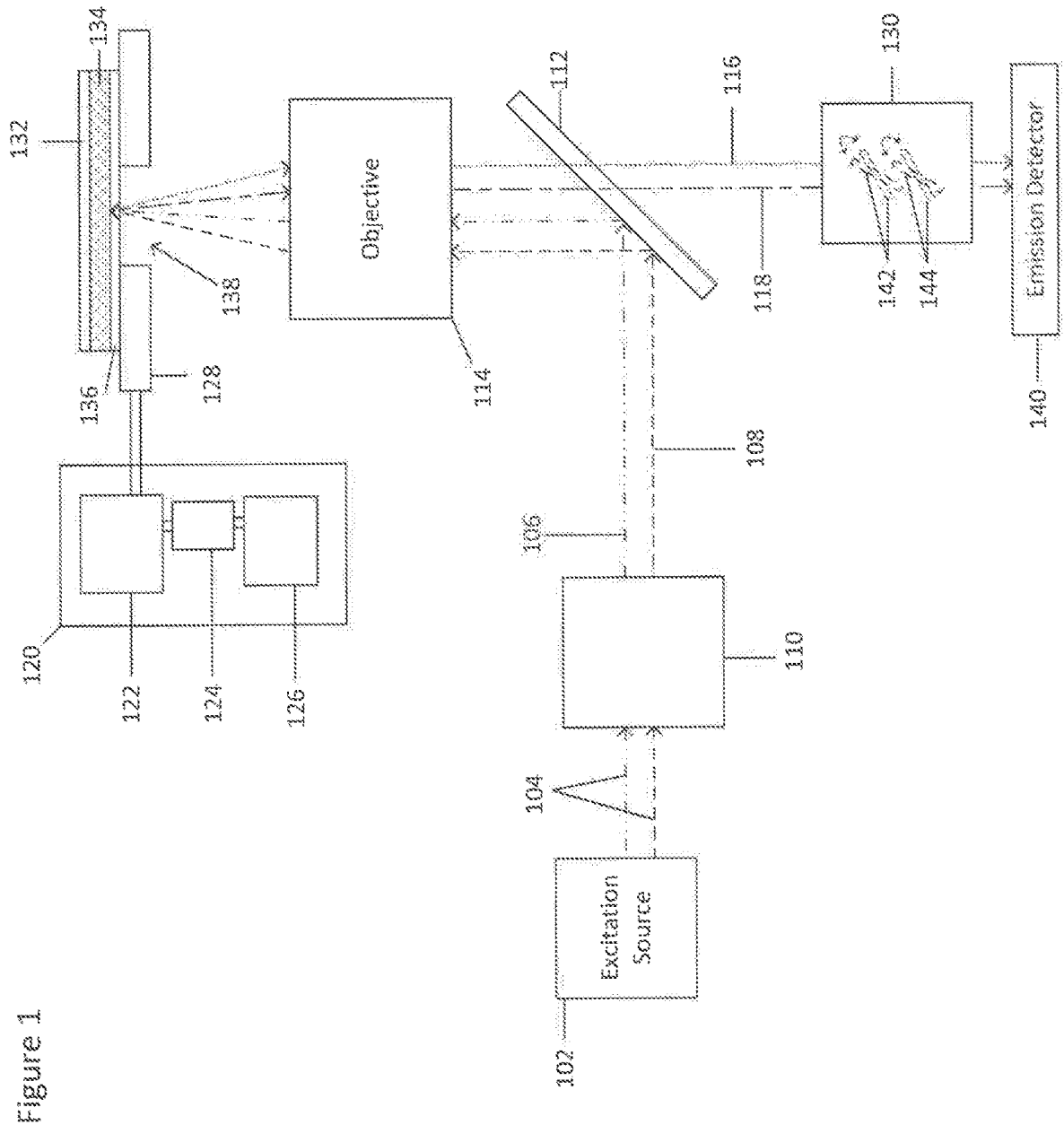
FIG. 1 is a schematic showing an embodiment of an optical train for a fluorescence microscope imaging system.

In the following description, the term "raw image" is used to describe an image (whether or not visually displayed to an operator or end user) including data or at least one signal, having been captured by a sensor or detector, which has not been processed.

In the following description, the term "final image" is used to describe an image (whether or not visually displayed to an operator or end user) including data or at least one signal which has been processed. "Final image" can also be used to describe an image (whether or not visually displayed to an operator or end user) which is an output image resulting from the comparison and/or analysis of two or more raw or other final images.

In the following descriptions, the term "light" is not intended to be limited to describing electromagnetic radiation in the visible portion of the electromagnetic spectrum but is also intended to describe radiation in the ultraviolet and infrared portions of the electromagnetic spectrum.

In the following descriptions, the term "sample" is used to describe an organic solid, an organic fluid, an inorganic solid, an inorganic fluid, a biological fluid, a biological semi-solid, a biological solid (which may remain solid, such as tissue, or may be liquefied in any appropriate manner), a suspension, a portion of the suspension, a component of the suspension, or the like.

In the following descriptions, the terms "target analyte" or "target material" are used to describe a biological material of interest.

In the following descriptions, the term "non-target analyte" is used to describe a biological material which is not a target analyte.

In the following descriptions, the term "biomarker" is used to describe a substance that is present on or within the target analyte or target material (i.e. intracellular or extracellular the target analyte; internalized, such as through phagocytosis, within the target analyte; or the like). Biomarkers include, but are not limited to, peptides, proteins, subunits, domains, motifs, epitopes, isoforms, DNA, RNA, or the like. The biomarker may be a target molecule for drug delivery.

In the following descriptions, the term "affinity molecule" is used to describe any molecule that is capable of binding to or interacting with another molecule. The interaction or binding can be covalent or non-covalent. The affinity molecule includes, but is not limited to, an antibody, a hapten, a protein, an aptamer, an oligonucleotide, a polynucleotide, or any appropriate molecule for interacting with or binding to another molecule (e.g., a biomarker; a molecule of a binding pair or a complementary molecule, including, without limitation, biotin or an avidin; or, the like).

In the following descriptions, the term "channel" is used to describe a color or color range based on the signal provided by one or more detection moieties of fluorophores. The color or color range is obtained based on the interference filters (i.e., excitation filter, emission filter, polychroic filter, dichroic filter) chosen and/or the wavelength of the signal(s). For example, a channel may be violet, blue, green, yellow, orange, red, dark red, or the like. Furthermore, when a plurality of channels is used, each channel has a specific color or color range. For example, a first channel may be green, and a second channel may be orange. It should be noted that although two or more detection moieties may provide signals having different wavelengths, the signals can be in the same channel based on the filter set used. For example, a first detection moiety provides a signal having a wavelength of 488 nm and a second detection moiety provides a signal having a wavelength of 500 nm. Even though the wavelengths are not identical, the filter set in one of the channels passes wavelengths of both 488 nm and 500 nm, which permits both to be imaged at the same time, thereby producing a single image including the 488 nm and 500 nm emissions. A channel may also describe the excitation and emission bandpass combination.

In the following descriptions, the term "detection moiety" is used to describe a compound or substance which provides a signal for detection, thereby indicating the presence of another compound or substance, an analyte, or the like within a sample or specimen. The detection moiety can be fluorescent, such as a fluorescent probe, or chromogenic, such as a chromogenic dye. The fluorescent probe can be a reactive dye, an organic dye, a fluorescent protein, a quantum dot, non-protein organic molecules, a nanoparticle (e.g., nanodiamond), a phosphor-integrated dot (PID), or the like.

The detection moiety is a compound or substance which provides a signal for detection, thereby indicating the presence of another compound or substance, an analyte, or the like within a sample or specimen. The detection moiety can be used as a tracer, as a label for certain structures, as a label for biomarkers, or the like. The detection moiety can be distributed or can label the appropriate structure or biomarkers in manners including, but not limited to, uptake, selective uptake, diffusion, and attachment to a linking molecule. The detection moiety can be bound to the biomarker by direct labeling or by indirect labeling.

The chromogenic dye, which can be used with various enzyme labels (e.g. horseradish peroxidase and alkaline phosphate), includes, but is not limited to, 3,3'-Diaminobenzidine (DAB), 3-Amino-9-Ethylcarbazole (AEC), 4-Chloro-1-Naphtol (CN), P-Phenylenediamine Dihydrochloride/pyrocatechol (Hanker-Yates reagent), Fast Red TR, New Fuchsin, Fast Blue BB, or the like. Fluorescent probes include, but are not limited to 1,5 IAEDANS; 1,8-ANS; 4-Methylumbelliferone; 5-carboxy-2,7-dichlorofluorescein; 5-Carboxyfluorescein (5-FAM); 5-Carboxynapthofluorescein; 5-Carboxytetramethylrhodamine (5-TAMRA); 5-FAM (5-Carboxyfluorescein); 5-HAT (Hydroxy Tryptamine); 5-Hydroxy Tryptamine (HAT); 5-ROX(carboxy-X-rhodamine); 5-TAMRA (5-Carboxytetramethylrhodamine); 6-Carboxyrhodamine 6G; 6-CR 6G; 6-JOE; 7-Amino-4-methylcoumarin; 7-Aminoactinomycin D (7-AAD); 7-Hydroxy-4-methylcoumarin; 9-Amino-6-chloro-2-methoxyacridine; AB Q; Acid Fuchsin; ACMA (9-Amino-6-chloro-2-methoxyacridine); Acridine Orange; Acridine Red; Acridine Yellow; Acriflavin; Acriflavin Feulgen SITSA; Aequorin (Photoprotein); AutoFluorescent Protein; Alexa Fluor350™; Alexa Fluor 430™; Alexa Fluor488™; Alexa Fluor 532™; Alexa Fluor546™; Alexa Fluor568™; Alexa Fluor 594™; Alexa Fluor 633™; Alexa Fluor647™; Alexa Fluor660™; Alexa Fluor680™; Alizarin Complexon; Alizarin Red; Allophycocyanin (APC); AMC; AMCA-S; AMCA (Aminomethylcoumarin); AMCA-X; Amino actinomycin D; Aminocoumarin; Aminomethylcoumarin (AMCA); Anilin Blue; Anthrocyl stearate; APC (Allophycocyanin); APC-Cy7; APTRA-BTC; APTS; Astrazon Brilliant Red 4G; Astrazon Orange R; Astrazon Red 6B; Astrazon Yellow 7 GLL; Atabrine; ATTO-TAG™ CBQCA; ATTO-TAG™ FQ; Auramine; Aurophosphine G; Aurophosphine; BAO 9(Bisaminophenyloxadiazole); BCECF (high pH); BCECF (low pH); Berberine Sulphate; Beta Lactamase; BFP blue shifted GFP (Y66H; Blue Fluorescent Protein); BFP/GFP FRET; Bimane; Bisbenzamide; Bisbenzimide (Hoechst); bis-BTC; Blancophor FFG; Blancophor SV; BOBO™-1; BOBO™-3; Bodipy 492/515; Bodipy 493/503; Bodipy 500/510; Bodipy 505/515; Bodipy 530/550; Bodipy 542/563; Bodipy 558/568; Bodipy 564/570; Bodipy 576/589; Bodipy 581/591; Bodipy 630/650-X; Bodipy 650/665-X; Bodipy 665/676; Bodipy Fl; Bodipy FL ATP; Bodipy Fl-Ceramide; Bodipy R6G SE; Bodipy TMR; Bodipy TMR-X conjugate; Bodipy TMR-X, SE; Bodipy TR; Bodipy TR ATP; Bodipy TR-X SE; BO-PRO™-1; BO-PRO™-3; Brilliant Sulphoflavin FF; Brilliant Violet 421; Brilliant Violet 510; Brilliant Violet 605; Brilliant Violet 650; Brilliant Violet 711; Brilliant Violet 786; BTC; BTC-5N; Calcein; Calcein Blue; Calcium Crimson™; Calcium Green; Calcium Green-1; Calcium Green-2; Calcium Green-5N; Calcium Green-C18; Calcium Orange; Calcofluor White; Carboxy-X-hodamine (5-ROX); Cascade Blue™; Cascade Yellow; Catecholamine; CCF2 (GeneBlazer); CFDA; CFP (Cyan Fluorescent Protein); CF405S; CF488A; CF 488; CF 543; CF 647; CF 750; CF 760; CF 780; FP/YFP FRET; Chlorophyll; Chromomycin A; Chromomycin A; CL-NERF; CMFDA; Coelenterazine; Coelenterazine cp; Coelenterazine f; Coelenterazine fcp; Coelenterazine h; Coelenterazine hcp; Coelenterazine ip; Coelenterazine n; Coelenterazine O; Coumarin Phalloidin; C-phycocyanine; CPM Methylcoumarin; CTC; CTC Formazan; Cy2™; Cy3.1 8; Cy3.5™; Cy3™; Cy5.1 8; Cy5.5™; CyS™; Cy7™; Cyan GFP; cyclic AMP Fluorosensor (FiCRhR); CyQuant Cell Proliferation Assay; Dabcyl; Dansyl; Dansyl Amine; Dansyl Cadaverine; Dansyl Chloride; Dansyl DHPE; DAPI; Dapoxyl; Dapoxyl 2; Dapoxyl 3; DCFDA; DCFH (Dichlorodihydrofluorescein Diacetate); DDAO; DHR (Dihydorhodamine 123); Di-4-ANEPPS; Di-8-ANEPPS; DiA (4-Di-16-ASP); Dichlorodihydrofluorescein Diacetate (DCFH); DiD-Lipophilic Tracer; DiD (DiIC18(5)); DIDS; Dihydorhodamine 123 (DHR); DiI (DiIC18(3)); Dinitrophenol; DiO (DiOC18(3)); DiR; DiR (DiIC18(7)); DM-NERF (high pH); DNP; Dopamine; DsRed; DTAF; DY-630-NHS; DY-635-NHS; EBFP (Enhanced Blue Fluorescent Protein); ECFP (Enhanced Cyan Fluorescent Protein); EGFP (Enhanced Green Fluorescent Protein); ELF 97; Eosin; ER-Tracker™ Green; ER-Tracker™ Red; ER-Tracker™ Blue-White DPX; Erythrosin; Erythrosin ITC; Ethidium Bromide; Ethidium homodimer-1 (EthD-1); Euchrysin; EukoLight; Europium (III) chloride; EYFP (Enhanced Yellow Fluorescent Protein); Fast Blue; FDA; FIF (Formaldehyde Induced Fluorescence); FITC; FITC Antibody; Flazo Orange; Fluo-3; Fluo-4; Fluorescein (FITC); Fluorescein Diacetate; Fluoro-Emerald; Fluoro-Gold (Hydroxystilbamidine); Fluor-Ruby; FluorX; FM 1-43™; FM 4-46; Fura Red™ (high pH); Fura Red™/Fluo-3; Fura-2, high calcium; Fura-2, low calcium; Fura-2/BCECF; Genacryl Brilliant Red B; Genacryl Brilliant Yellow 10GF; Genacryl Pink 3G; Genacryl Yellow SGF; GeneBlazer (CCF2); GFP (S65T); GFP red shifted (rsGFP); GFP wild type, non-UV excitation (wtGFP); GFP wild type, UV excitation (wtGFP); GFPuv; Gloxalic Acid; Granular Blue; Haematoporphyrin; Hoechst 33258; Hoechst 33342; Hoechst 34580; HPTS; Hydroxycoumarin; Hydroxystilbamidine (FluoroGold); Hydroxytryptamine; Indo-1, high calcium; Indo-1, low calcium; Indodicarbocyanine (DiD); Indotricarbocyanine (DiR); Intrawhite Cf JC-1; JO-JO-1; JO-PRO-1; LaserPro; Laurodan; LDS 751; Leucophor PAF; Leucophor SF; Leucophor WS; Lissamine Rhodamine; Lissamine Rhodamine B; Calcein/Ethidium homodimer; LOLO-1; LO-PRO-1; Lucifer Yellow; Lyso Tracker Blue; Lyso Tracker Blue-White; Lyso Tracker Green; Lyso Tracker Red; Lyso Tracker Yellow; LysoSensor Blue; LysoSensor Green; LysoSensor Yellow/Blue; Mag Green; Magdala Red (Phloxin B); Mag-Fura Red; Mag-Fura-2; Mag-Fura-5; Mag-Indo-1; Magnesium Green; Magnesium Orange; Malachite Green; Marina Blue; Maxilon Brilliant Flavin 10 GFF; Maxilon Brilliant Flavin 8 GFF; Merocyanin; Methoxycoumarin; Mitotracker Green; Mitotracker Orange; Mitotracker Red; Mitramycin; Monobromobimane; Monobromobimane (mBBr-GSH); Monochlorobimane; MPS (Methyl Green Pyronine Stilbene); mStrawberry; NBD; NBD Amine; Nile Red; Nitrobenzoxadidole; Noradrenaline; Nuclear Fast Red; Nuclear Yellow; Nylosan Brilliant lavin EBG; Oregon Green™; Oregon Green™ 488; Oregon Green™ 500; Oregon Green™ 514; Pacific Blue; Pararosaniline (Feulgen); PBFI; PE-Cy5; PE-Cy7; PerCP; PerCP-Cy5.5; PE-TexasRed (Red 613); Phloxin B (Magdala Red); Phorwite AR; Phorwite BKL; Phorwite Rev; Phorwite RPA; Phosphine 3R; PhotoResist; Phycoerythrin B; Phycoerythrin R; PKH26 (Sigma); PKH67; PMIA; Pontochrome Blue Black; POPO-1; POPO-3; PO-PRO-1; PO-PRO-3; Primuline; Procion Yellow; Propidium Iodid (PI); Pyrene; Pyronine; Pyronine B; Pyrozal Brilliant Flavin 7GF; QD400; QD425; QD450; QD500; QD520; QD525; QD530; QD535; QD540; QD545; QD560; QD565; QD570; QD580; QD585; QD590; QD600; QD605; QD610; QD620; QD625; QD630; QD650; QD655; QD705; QD800; QD1000; QSY 7; Quinacrine Mustard; Red 613 (PE-TexasRed); Resorufin; RFP; RH 414; Rhod-2; Rhodamine; Rhodamine 110; Rhodamine 123; Rhodamine 5 GLD; Rhodamine 6G; Rhodamine B; Rhodamine B 200; Rhodamine B extra; Rhodamine BB; Rhodamine BG; Rhodamine Green; Rhodamine Phallicidine;

Rhodamine Phalloidine; Rhodamine Red; Rhodamine WT; Rose Bengal; R-phycocyanine; R-phycoerythrin; rsGFP (red shifted GFP (S65T)); S65A; S65C; S65L; S65T; Sapphire GFP; SBFI; Serotonin; Sevron Brilliant Red 2B; Sevron Brilliant Red 4G; Sevron Brilliant Red B; Sevron Orange; Sevron Yellow L; sgGFP™ (super glow GFP; SITS (Primuline); SITS (Stilbene Isothiosulphonic Acid); SNAFL calcein; SNAFL-1; SNAFL-2; SNARF calcein; SNARF1; Sodium Green; SpectrumAqua; SpectrumGreen; SpectrumOrange; Spectrum Red; SPQ (6-methoxy-N-(3-sulfopropyl)quinolinium); Stilbene; Sulphorhodamine B can C; Sulphorhodamine G Extra; SYTO 11; SYTO 12; SYTO 13; SYTO 14; SYTO 15; SYTO 16; SYTO 17; SYTO 18; SYTO 20; SYTO 21; SYTO 22; SYTO 23; SYTO 24; SYTO 25; SYTO 40; SYTO 41; SYTO 42; SYTO 43; SYTO 44; SYTO 45; SYTO 59; SYTO 60; SYTO 61; SYTO 62; SYTO 63; SYTO 64; SYTO 80; SYTO 81; SYTO 82; SYTO 83; SYTO 84; SYTO 85; SYTOX Blue; SYTOX Green; SYTOX Orange; SYTOX Red; Tetracycline; Tetramethylrhodamine (TRITC); Texas Red™; Texas Red-X™ conjugate; Thiadicarbocyanine (DiSC3); Thiazine Red R; Thiazole Orange; Thioflavin 5; Thioflavin S; Thioflavin TCN; Thiolyte; Thiozole Orange; Tinopol CBS (Calcofluor White); TMR; TO-PRO-1; TO-PRO-3; TO-PRO-5; TOTO-1; TOTO-3; Tri-Color (PE-Cy5); TetramethylRodamineIsoThioCyanate; True Blue; TruRed; Tubulin Tracker™ Green; Ultralite; Uranine B; Uvitex SFC; wt GFP (wild type GFP); WW 781; X-Rhodamine; XRITC; Xylene Orange; Y66F; Y66H; Y66W; Yellow GFP (Yellow shifted); Green Fluorescent Protein; YFP (Yellow Fluorescent Protein); YO-PRO-1; YO-PRO-3; YOYO-1; YOYO-3; CF350, CF405S, CF405M, CF405L, CF430, CF440, CF450, CF488A, CF503R, CF514, CF532, CF543, CF550R, CF555, CF568, CF570, CF583, CF594, CF620R, CF633, CF640R, CF647, CF660C, CF660R, CF680, CF680R, CF700, CF750, CF770, CF790, CF800, CF820, DY-3441N, DY-350XL, DY-360XL, DY-370XL, DY-376XL, DY-380XL, DY-395XL, DY-396XL, DY-480XL, DY-481XL, DY-485XL, DY-510XL, DY-511XL, DY-520XL, DY-521XL, DY-601XL, DY-350, DY-351, DY-405, DY-410, DY-415, DY-430, DY-431, DY-478, DY-488, DY-490, DY-495, DY-505, DY-530, DY-546, DY-547, DY-547P1, DY-548, DY-548P1, DY-549, DY-549P1, DY-550, DY-554, DY-555, DY-556, DY-557, DY-560, DY-580, DY-585, DY-590, DY-591, DY-594, DY-605, DY-610, DY-615, DY-630, DY-631, DY-632, DY-633, DY-634, DY-635, DY-636, DY-641, DY-643, DY-647, DY-647P1, DY-648, DY-648P1, DY-649, DY-649P1, DY-650, DY-651, DY-652, DY-654, DY-660P1, DY-675, DY-676, DY-677, DY-678, DY-679P1, DY-680, DY-681, DY-682, DY-684, DY-700, DY-701, DY-703, DY-704, DY-705, DY-706, DY-720, DY-730, DY-731, DY-732, DY-734, DY-736, DY-749, DY-747P1, DY-749P1, DY-750, DY-751, DY-752, DY-754, DY-765, DY-776, DY-777, DY-778, DY-780, DY-781, DY-782, DY-784, DY-800, DY-805, DY-820, DY-831, DY-845, DY-865 and, combinations and derivatives thereof. In one embodiment, the detection moiety, such as organic fluorophore, can have a molecule weight of approximately 0.01 kD or greater, including, without limitation, a molecular weight of at least 1 kD, at least 10 kD, at least 25 kD, at least 50 kD, at least 75 kD, at least 100 kD, at least 150 kD, at least 200 kD, at least 250 kD, at least 300 kD, at least 340 kD, at least 350 kD, at least 500 kD, and at least 750 kD.

In the following descriptions, the terms "stain" or "label," which are used interchangeably, are used to describe an affinity molecule bound to or interacted with a detection moiety. The binding or interaction can be direct or indirect. Direct binding or interaction includes covalent or non-covalent interactions between the biomarker and the detection moiety. Indirect binding or interaction includes the use of at least first and second complementary molecules which form binding pairs. The first and second complementary molecules are, in combination, binding pairs which can bind or interact in at least one of the following manners: hydrophobic interactions, ionic interactions, hydrogen bonding interactions, non-covalent interactions, covalent interactions, affinity interactions, or the like. The binding pairs include, but are not limited to, immune-type binding-pairs, such as, antigen-antibody, antigen-antibody fragment, hapten-anti-hapten, or primary antibody-secondary antibody; nonimmune-type binding-pairs, such as biotin-avidin, biotin-streptavidin, folic acid-folate binding protein, hormone-hormone receptor, lectin-specific carbohydrate, enzyme-enzyme, enzyme-substrate, enzyme-substrate analog, enzyme-pseudo-substrate (substrate analogs that cannot be catalyzed by the enzymatic activity), enzyme-cofactor, enzyme-modulator, enzyme-inhibitor, or vitamin B12-intrinsic factor. Other suitable examples of binding pairs include complementary nucleic acid fragments (including complementary nucleotides, oligonucleotides, or polynucleotides); Protein A-antibody; Protein G-antibody; nucleic acid-nucleic acid binding protein; polymeric linkers (e.g., polyethylene glycol); or polynucleotide-polynucleotide binding protein. The binding pairs can be included within or used as amplification techniques. Amplification techniques are also implemented to increase the number of detection moieties bound to or interacted with the biomarker to increase a signal. In one embodiment, when binding pairs are used, the stain can be pre-conjugated, such that, during a labeling, staining, or adding step, the affinity molecule is already bound to or interacted with a detection moiety when added to the sample. In one embodiment, when binding pairs are used, the stain can be conjugated in the sample, such that the labeling, staining, or adding step includes introducing (in any desired or appropriate order) an affinity molecule-first binding molecule conjugate and a second binding pair molecule-detection moiety conjugate, wherein the first and second binding pair molecules are complementary and bind to or interact with each other.

Furthermore, "a plurality of stains" can be used to describe two or more stains in which the affinity molecules and/or the detection moieties are different. For example, anti-CK-Alexa 647 is different than anti-EpCAM-Alexa 647. As another example, anti-CK-Alexa 647 is different than anti-CK-Alexa 488.

In the following descriptions, the term "conjugate" is used to describe a first chemical, molecule, moiety, or the like bound to or interacted with a second chemical, molecule, moiety, or the like. The binding or interaction is direct or indirect. Direct binding or interaction includes covalent or non-covalent interactions between the biomarker and the detection moiety. Indirect binding or interaction includes the use of at least first and second complementary molecules which form binding pairs. The first and second complementary molecules are, in combination, binding pairs which binds or interacts in at least one of the following manners: hydrophobic interactions, ionic interactions, hydrogen bonding interactions, non-covalent interactions, covalent interactions, affinity interactions, or the like. The binding pairs include, but are not limited to, immune-type binding-pairs, such as, antigen-antibody, antigen-antibody fragment, hapten-anti-hapten, or primary antibody-secondary antibody; nonimmune-type binding-pairs, such as biotin-avidin, biotin-streptavidin, folic acid-folate binding protein, hormone-hormone receptor, lectin-specific carbohydrate, enzyme-enzyme, enzyme-substrate, enzyme-substrate analog, enzyme-pseudo-substrate (substrate analogs that cannot be catalyzed by the enzymatic activity), enzyme-cofactor, enzyme-modulator, enzyme-inhibitor, or vitamin B12-intrinsic factor. Other suitable examples of binding pairs include complementary nucleic acid fragments (including complementary nucleotides, oligonucleotides, or polynucleotides); Protein A-antibody; Protein G-antibody; nucleic acid-nucleic acid binding protein; polymeric linkers (e.g., polyethylene glycol); or polynucleotide-polynucleotide binding protein.

In the following description, the term "signal" is used to describe an electric current or electromagnetic field which conveys data from one place or source to another place or detector. For example, a signal can be light emitted by a detection moiety to convey the presence of the detection moiety on or within a sample or a target analyte, such as a cell.

In the following description, the term "multiplex" is used to describe process or kit by which a sample is labeled with a plurality of stains. Each of the detection moieties emit different wavelengths. For example, at least two stains can be used to label the sample. Multiplexing can include up to 2, 4, 6, 8, 10, 12, 16, 20, 24, 30, 40, 50, 60, 70, 80, 90, 100, or more stains.

An example method for labeling a biomarker on a target analyte is discussed. In one embodiment, a sample, suspected of including at least one target analyte is obtained. Suitable devices, systems, and/or methods of sample collection and/or processing may include those described in one or more of the following U.S. patents and published applications, each of which is hereby incorporated by reference in its entirety: U.S. Pat. Nos. 7,074,577; 7,220,593; 7,329,534; 7,358,095; 7,629,176; 7,915,029; 7,919,049; 8,012,742; 9,039,999; 9,217,697; 9,492,819; 9,513,291; 9,533,303; 9,539,570; 9,541,481; 9,625,360; 10,345,237; 2014/0161688; 2017/0014819; 2017/0059552; 2017/0074759; 62/873,390. Suitable devices, systems, and/or methods for target analyte retrieval, isolation, or picking may include those described in one or more of the following U.S. patents and published applications, each of which is hereby incorporated by reference in its entirety: U.S. Pat. Nos. 9,222,953; 9,440,234; 9,519,002; 9,810,605; 2017/0219463; 2017/0276575.

In one embodiment, the sample can undergo staining after collection and or processing of the sample. In one embodiment, the sample can be multiplexed. At least one stain is added to the sample for labeling, such as by an autostainer or manually by an operator. In one embodiment, the at least one target analyte is stained. In one embodiment, at least one non-target analyte or non-target material is stained. In one embodiment, the at least one target analyte and the at least one non-target analyte or materials are stained.

After staining, the sample can be imaged, whereby the stained sample is illuminated with one or more wavelengths of excitation light, such as infrared, red, blue, green, and/or ultraviolet, from a light source, such as a laser or a light-emitting diode. The imaging can be done with a flow cytometer or a microscope, such as a fluorescence microscope, a scanner, or any other appropriate imaging system or modality. In one embodiment, imaging can be performed in a system in which a detection moiety, when imaged, can provide a signal across a spectrum, including, without limitation, brightfield and/or darkfield illumination, fluorescence, and the like. The images formed can be overlaid when a plurality of detection moieties is used. Emission, reflection, diffraction, scatter, and combinations thereof are used in for detection/imaging. The images can be analyzed to detect, enumerate, and/or locate the target analyte, such as when it is desirous to retrieve or pick the target analyte. Imaging is performed in a tube, on a microscope slide, or in any appropriate vessel or substrate for imaging.

The methods can be performed by at least one of an imaging microscope, a scanner, a flow cytometer, or a microfluidic device, such as a chip or a microchannel, or the method can be performed by any combination of the above. The methods described can be used in a system in which a detection moiety, when imaged, can provide a signal across a spectrum, including, without limitation, brightfield and/or darkfield illumination, fluorescence, and the like.

Optical Trains for Imaging Systems

In fluorescence microscopy, a fluorophore (or fluorescent dye) is used to stain a sample, such as proteins or other molecules of interest, tissues, and cells for examination or study. Fluorophores can absorb light of one wavelength and emit (fluoresce) light of another wavelength. In a typical fluorescence microscopy setup three filters are used: an excitation filter, an emission filter and a dichroic filter. Each fluorophore has a specific absorption or excitation wavelength band and the excitation filter is selected to transmit that range of excitation wavelengths. The fluorophore, once excited, will emit a range of wavelengths. The emission filter transmits the desired emission wavelengths. A dichroic filter that is specifically designed to reflect the excitation wavelengths and transmit the emission wavelengths is used to separate the excitation and emission channels. A dichroic filter may also be designed to reflect the emission wavelengths and to transmit the excitation wavelengths.

FIG. 1 shows one embodiment of an optical train of a fluorescence microscope imaging system. The optical path may include an excitation source 102 which emits at least one excitation light 104, such as a light in the visible, infrared ("IR"), or ultraviolet ("UV") spectra. The excitation source 102 may include a laser light source, an LED light source, a xenon light source, a halogen light source, an incandescent light source, or other appropriate light sources. In some embodiments, the excitation light 104 comprises a plurality of wavelengths, including at least a first excitation wavelength 106 and a second excitation wavelength 108. In such embodiments, the excitation light 104 may interact with an excitation spectrum selector 110, such that the first excitation wavelength 106 passes through the excitation spectrum selector 110 and the second excitation wavelength 108 is blocked from passing through the excitation spectrum selector 110. In particular embodiments, the excitation spectrum selector 110 may include one or more optical filters or interference filters, such as one or more variable excitation filters. In one such embodiment, after the first excitation wavelength 106 exits an excitation filter of the excitation spectrum selector 110 it is then reflected off a second filter 112. The second filter 112 re-directs the first excitation wavelength 106 into an objective 114. The second filter 112 can be a dichroic, polychroic, shortpass, longpass, bandpass, bandstop, or any appropriate filter.

With continued reference to FIG. 1, the objective 114 receives the first excitation wavelength 106 reflected by the second filter 112 and focuses the first excitation wavelength 106 at a point or surface on, within, or near a sample or fraction thereof 134. The first excitation wavelength 106 stimulates a first detection moiety (not shown) on or within the sample or fraction thereof 134, thereby causing the first detection moiety (not shown) to emit a first emission wavelength signal 116. The first emission wavelength signal 116 can be captured by the objective 114, transmitted through the second filter 112 which is configured to pass the first emission wavelength, and then transmitted through an emission spectrum selector 130, and onto an emission detector 140 where a raw image is captured or acquired. The emission detector 140 can be a charge-coupled device ("CCD"), CMOS camera, a scientific CMOS camera, photodiode, photomultiplier tube, or the like for capturing image data, which can then be compiled into images, processed and analyzed by a computer or associated software or programs. In certain embodiments, the second filter 112 is a dichroic filter configured to reflect shorter wavelengths that typically excite fluorophores and transmit longer wavelengths that are emitted by the fluorophores. Together, the second filter 112 and the emission spectrum selector 130 are configured to limit or prevent non-emission energy and stray light from reaching the sensor of the emission detector 140.

In further embodiments, the excitation source 102 emits the excitation light 104 and then interacts with the excitation spectrum selector 110, such that the second excitation wavelength 108 passes through the excitation spectrum selector 110 and the first excitation wavelength 106 is blocked from passing through the excitation spectrum selector 110. The second excitation wavelength 108 is then reflected off the second filter 112, thereby re-directing the second excitation wavelength 108 into the objective 114. The objective 114 receives the second excitation wavelength 108 and focuses the second excitation wavelength 108 at a point or surface on, within, or near a sample or fraction thereof 134. The second excitation wavelength 108 stimulates a second detection moiety (not shown) on or within the sample or fraction thereof 134, thereby causing the second detection moiety (not shown) to emit a second emission wavelength signal 118. The second emission wavelength signal 118 can be captured by the objective 114, transmitted through the second filter 112, passed through the emission spectrum selector 130, and onto an emission detector 140 where a raw image may be captured. The process described can be performed one or more times for a desired number of detection moieties.

In alternate embodiments, the excitation source 102 may be configured to emit the excitation light 104 as one or more separate wavelengths such as the first excitation wavelength 106 and the second excitation wavelength 108. In other embodiments, the optical path of a fluorescence microscope shown in FIG. 1, optionally does not include the excitation spectrum selector 110.

With continued reference to FIG. 1, the sample or fraction thereof 134 can be located on a base 132 or between a cover 136 and the base 132. The cover 136 and the base 132 can be optically clear or optically transparent to permit imaging. In some embodiments, the base 132 and the cover 136 can be composed of one or more of a glass; an inert metal; a metal; a metalloid; organic or inorganic materials, and plastic materials, such as a polymer; and combinations thereof.

The sample 134, the cover 136, and the base 132 can be located on a platform 128 to move the sample 134 in an x-, y-, or z-direction as required. The platform 128 can include an aperture 138 which allows the first excitation wavelength 106, having been focused by the objective 114, into, on, or near the sample or fraction thereof 134. The platform 128 can be driven by a driver 120, which includes at least one of a z-direction drive 124, an x-direction drive 122, and a y-direction drive 126 to position the sample 134. The driver 120 can be a motor, such as a servomotor or a stepper motor, a piezo-electric actuator, a solenoid, or the like.

The optical path can also include a cut-off aperture (not shown), such as in a confocal microscope, to increase the signal/noise ratio of the boundary light signal.

In one embodiment, the excitation spectrum selector 110 or the emission spectrum selector 130 can be at least one fixed filter or at least one variable or tiltable filter configured to block or pass desired wavelengths of light. In one embodiment, the excitation spectrum selector 110 or the emission spectrum selector 130 can be a notch filter, a bandstop filter, a longpass filter, a shortpass filter, a bandpass filter, or a polychroic filter. In one embodiment, the excitation spectrum selector 110 or the emission spectrum selector 130 can be a diffraction grating. In another embodiment, the excitation spectrum selector 110 or the emission spectrum selector 130 can include a variable angle or variable tilt filter capable of being re-angled to block or pass selected wavelengths by changing the relative angle of incidence of incoming excitation or emission light rays on the filter. As an example, the first excitation wavelength 106 passes through the excitation spectrum selector 110 and the second excitation wavelength 108 is blocked from passing through the excitation spectrum selector 110 due to, at least in part, the angle of the excitation spectrum selector 110. Alternately, the excitation spectrum selector 110 can be selectively angled to block the first excitation wavelength 106 and let pass the second excitation wavelength 108. As used herein, the angle of incidence is the angle (θ) between a light ray incident on a surface and the line perpendicular to the surface at the point of incidence.

In another embodiment, the first emission wavelength signal 116 passes through the emission spectrum selector 130 and the second emission wavelength signal 118 is blocked from passing through the emission spectrum selector 130 due, at least in part, to the angle of the emission spectrum selector 130. Alternately, the emission spectrum selector 130 can be selectively angled to block the first emission wavelength signal 116 and let pass the second emission wavelength signal 118.

With continued reference to FIG. 1, the emission spectrum selector 130 can include at least one or more interference filters, or more particularly emission filters, such as the first emission filter 142 and the second emission filter 144. The first emission filter 142 and the second emission filter 144 may be configured such that each one is a variable filter capable of being tilted or angled on axes that are parallel or, alternatively, perpendicular to each other. The first emission filter 142 can be tilted or angled to realize a desired angle of incidence (denoted by the longer dashed line filter 142) between the first emission filter 142 and the emission light rays. Similarly, the second emission filter 144 can be tilted or angled to realize a desired angle of incidence (denoted by the longer dashed line filter 144) between the second emission filter 144 and the emission light rays.

The first emission filter 142 and the second emission filter 144 can be tilted or angled independently of each other. In certain embodiments, the first emission filter 142 can be variably positioned to any desired position (i.e., first position, second position, third position, fourth position, and so on until the $n^{th}$ position) with each position corresponding to a different angle θ. Likewise, the second emission filter 144 can be variably positioned to any desired position (i.e., first position, second position, third position, fourth position, and so on until the $n^{th}$ position) with each position corresponding to a different angle θ. The first emission filter 142 and the second emission filter 144 can have a position or angle independent of each other, such that one or both of the first emission filter 142 and the second emission filter 144 can be angled or tilted to the same angle of incidence or different angles of incidence relative to one or more emission light rays. In particular embodiments, the first emission filter 142 and the second emission filter 144 can be angled to let pass or block desired wavelengths of emission light.

For example, a first raw image can be obtained with the first emission filter 142 at a first angle of incidence and the second emission filter 144 at a third angle of incidence. Then the first emission filter 142 can be re-angled from the first angle of incidence to a second angle of incidence, while the second emission filter 144 stays at the third angle of incidence. A second raw image can then be obtained. Additionally, in capturing at least one more raw image, the second emission filter 144 can be re-angled from the third angle of incidence to a fourth angle of incidence. A third raw image can then be obtained. In one embodiment, at least two of the first, second, third, and fourth angles of incidence are the same. In one embodiment, none of the first, second, third, and fourth angles of incidence are the same.

In any of the embodiments including tilting or angling at least one filter, any filter can be tilted or angled at any desired time or sequence to block or let pass a desired emission wavelength range. For example, after obtaining a first raw image with the first emission filter 142 at a first angle of incidence, the first emission filter 142 can be tilted or angled to a second angle of incidence. A second raw image can then be obtained. Then, the first emission filters 142 can be tilted or angled again and a third raw image can then be obtained. In other words, each filter can be tilted or angled independently of the other filter or filters at any point and by any amount to obtain any raw image and/or any desired range of emission wavelength range.

Furthermore, any number of filters can be used, including, without limitation, 1, 2, 3, 4, 5, 6, 7, 8, 9, 10, 11, 12, 15, 20, 25, 30, 40, 50, 60, 70, 75, 80, 90, or 100.

Some particular examples and embodiments of the excitation spectrum selector 110 may include one or more variable interference filters configured such that the wavelength blocking and transmission can be tuned by tilting the filter and changing the angle of incidence of the light path on the filter. In some embodiments, at least one of the excitation spectrum selector 110 and/or the emission spectrum selector 130 can include at least one variable interference filter capable of being tilted or angled. In certain such embodiments, both of the excitation spectrum selector 110 and the emission spectrum selector 130 can include at least one variable interference filter. In such embodiments, the variable interference filters may be excitation filters, emission filters, polychroic filters, and are configured for use with multichannel fluorescence microscopy and high throughput imaging systems.

The individual filters of the excitation spectrum selector 110 or the emission spectrum selector 130 and/or the angle of incidence between the filters and the excitation or emission light rays can be selected to provide the desired wavelengths for the capture of raw images at selected bandwidths of the emission spectrum of one or more detection moieties. For example, interference filters included in the excitation spectrum selector 110 and/or the emission spectrum selector 130 are configured to block and/or transmit desired wavelengths along the optical path for the capture of raw images at locations on the lower and higher edges of one or more emission spectrum spectral edges. For example, in one embodiment, the detection moieties can have differences in spectra at their peaks of less than or equal to 50 nm. In one embodiment the detection moieties can have differences in spectra at their peaks of less than or equal to 10 nm. In one embodiment, the detection moieties can have differences in spectra at their peaks of 1-50 nm. In one embodiment, the detection moieties may be separated by a few nanometers in spectra at their peaks, including but not limited to 1, 2, 3, 4, 5, 6, 7, 8, 9, 10, 11, 12, 15, 20, 25, 30, 40, 50, 60, 70, 75, 80, 90, or 100 nm. In one embodiment, the difference between successive spectra (such as at the peak) can be the same (e.g., first and second detection moieties are separated by 10 nm and second and third detection moieties are separated by 10 nm). In one embodiment, the differences between successive spectra (such as at the peak) can be different (e.g., first and second detection moieties are separated by 10 nm and second and third detection moieties are separated by 25 nm).

In one embodiment, the angle $\theta$ of incidence of light upon any filter can be any angle, including, but not limited to approximately 0.0°, 1.0°, 2.0°, 3.0°, 4.0°, 5.0°, 6.0°, 7.0°, 8.0°, 9.0°, 10.0°, 11.0°, 12.0°, 15.0°, 20.0°, 25.0°, 30.0°, 40.0°, 45.0°, 50.0°, 60.0°, 70.0°, 75.0°, 80.0°, 85.0°, or 89.9°. In one embodiment, the approximate angle of incidence of light upon any filter can be up to, but not inclusive of, 90°. In one embodiment, the approximate angle of incidence of light upon any filter can be less than 90°. In one embodiment, the approximate angle of incidence of light upon any filter can be from 0.0° to 89.9°. In certain embodiments, when there are two or more tiltable filters, each filter may tilt freely and independently of the other filters, such that two or more filters can have the same angle of incidence or no two filters have the same angle of incidence. In particular embodiments, the angles of incidence are selected based on the desired wavelength to be passed or blocked by the filter.

Filter Changer

An optical train of an imaging system disclosed herein may include a filter changer configured to quickly and easily change between multiple optical filters. In certain embodiments, the filter changer may be a filter slide or a filter wheel configured to hold one or more optical filters. The filter changer disclosed herein may be configured for use in systems and methods for multichannel fluorescence microscopy and automated high throughput imaging systems. In some embodiments, at least one of the excitation spectrum selector 110 and/or the emission spectrum selector 130 can be configured to include at least one filter changer having one or more variable optical filters, such as one or more variable interference filters, capable of being tilted or angled. For example, with reference to FIG. 1, one or both of the first or second emission filters 142, 144 can be a variable interference filter that is held by a filter changer having one or more variable interference filters.

Figure 2A:
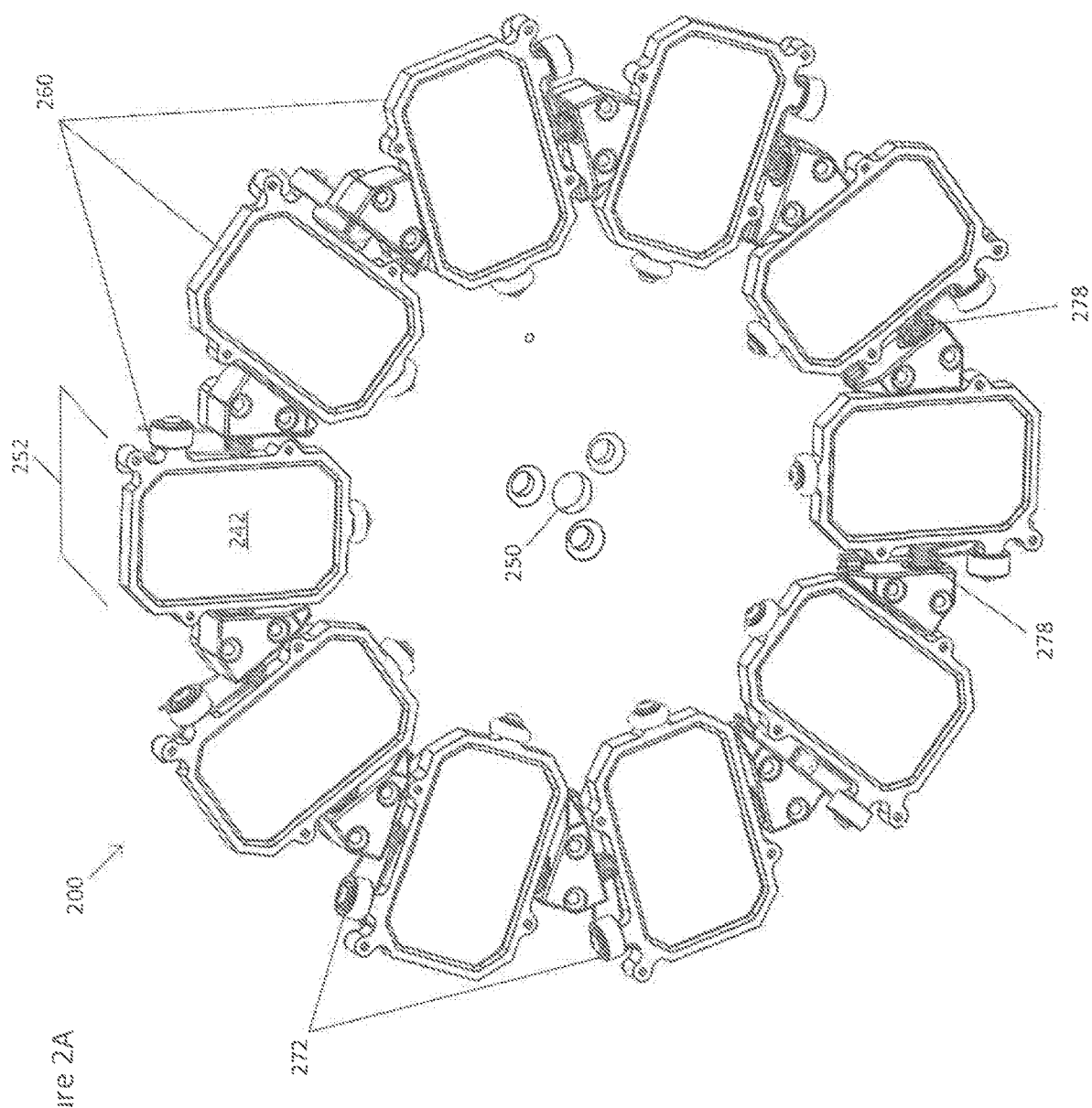
FIG. 2A is a perspective view of one embodiment of a filter wheel.

Referring to FIG. 2A, one embodiment of a filter changer may be a rotary filter wheel, the filter wheel 200 includes one or more optical filters such as variable interference filter 242 that may be positioned in the optical path of the optical train. The filter wheel 200 may be configured to rotate on or around an axis or an axle at hub 250 in a clockwise or counter-clockwise direction. The filter wheel 200 may be designed with position indicators or detents located at desired positions of the filter wheel 200. For example, the filter wheel 200 may be rotated manually or by a motor with an axle attached to the hub 250 in order to position the variable interference filter 242 in any desired filter position, such as the filter position 252. In preferred embodiments, the filter position 252 is located in the optical path of a light beam travelling through the optical train thereby locating the variable interference filter 242 in the optical path of the light beam. For example, the filter wheel 200 is rotated by a motor with an axle attached to the hub 250 to position the variable interference filter 242 in the optical path of one or both of the first emission wavelength signal 116 and the second emission wavelength signal 118 (see also, FIG. 1 and FIG. 4B).

In some embodiments, the filter changer, such as a filter slide or filter wheel 200, may include at least one filter assembly configured to hold an optical filter. As shown in FIG. 2A, the filter wheel 200 may include at least one filter assembly 260 configured to hold an optical filter, such as variable interference filter 242. In certain embodiments, the filter wheel 200 may include at least 1, 2, 3, 4, 5, 6, 7, 8, 9, 10, 11, 12, 13, 14, 15, 16, 17, 18, 19, 20 and more of filter assembly 260. In one embodiment, the filter wheel 200 includes two or more of filter assembly 260, and each filter assembly 260 includes an optical filter, wherein no two optical filters have all the same optical filter properties. In another embodiment, each of the two or more of filter assembly 260 comprises an optical filter, wherein at least two optical filters have the same optical filter properties. In still other embodiments, the filter changer may include at least one filter assembly 260 without a filter, such as a filter assembly 260 comprising an optical window, clear glass, or the filter assembly 260 may not hold anything.

Referring to FIG. 2B, some embodiments of the filter assembly 260 are configured to hold an interference filter, such as variable interference filter 242, within a case having a base 264 and a retainer 266. In one embodiment, the base 264 and the retainer 266 may include one or more hold down clips 276 and provide a window 274 configured to permit light to pass through the variable interference filter 242. In particular embodiments, the base 264 can further include at least one bearing 278 configured to allow for tilting, rotation and/or translation of the filter assembly 260 while attached to the filter wheel 200. In one embodiment, at least one bearing 278 may be configured to allow for tilting and/or translation of the filter assembly 260, including the variable interference filter 242, the base 264, and the retainer 266, while attached to the filter wheel 200, so as to change the angle of incidence between the variable interference filter 242 and the excitation or emission light rays in the optical path of the optical train.

Now referencing FIG. 3, in certain embodiments of an optical train for an imaging system comprising the filter wheel 200, a tilt mechanism may be configured to engage with the filter assembly and tilt the filter assembly. For example, a tilt mechanism, such as a cam 300, may be configured to engage with the filter assembly 260 while it is located in the optical path. In specific embodiments, a tilt mechanism, such as the cam 300, is configured to engage with the bearing 272 of the filter assembly 260 and configured to tilt the filter assembly 260 and the variable interference filter 242, thereby changing the angle of incidence between the variable interference filter 242 and emission or excitation light rays in the optical path.

The cam 300 can include a main body 302 and a tail 304 extending from the main body 302, the tail comprising an engagement surface 308 to engage the bearing 272 of the filter assembly 260. The tail 304 of the cam 300 can be any appropriate shape or configuration, for example, rectangular, cubical, triangular, pyramidal, curved, hooked, horn-shaped, or combinations thereof, or the like. Furthermore, the tail 304 can be sized and shaped so as to avoid any other components when the cam is rotated. In one embodiment of the cam 300, the main body 302 comprises a bore 310 extending at least partially through the main body 302 to mate with a motor 320 or connector to adjoin the motor 320 and the cam 300. In one embodiment, the main body 302 comprises an axle or other connector to mate with the motor 320. In another embodiment, the cam 300 and the motor 320 may be an integrated unit or single piece.

In one embodiment of the filter wheel 200, the filter assembly 260 and variable interference filter 242 at filter position 252 may be tilted by engagement of the bearing 272 with the cam 300 such that the angle of incidence of light upon the filter can be any angle of incidence ranging from approximately 0.0° to 89.9°. For example, the angle of incidence of light upon a desired filter can be approximately, but not limited to 0.0°, 1.0°, 2.0°, 3.0°, 4.0°, 5.0°, 6.0°, 7.0°, 8.0°, 9.0°, 10.0°, 11.0°, 12.0°, 15.0°, 20.0°, 25.0°, 30.0°, 40.0°, 45.0°, 50.0°, 60.0°, 70.0°, 75.0°, 80.0°, 85.0°, or 89.9°. In certain embodiments, when there are two or more variable interference filters located in the optical path, each filter may be configured to tilt freely and independently of the other filters, such that two or more filters can have the same angle of incidence or no two filters have the same angle of incidence. The angles of incidence may be selected based on the desired wavelength to be blocked or passed by the filter.

Correction of Optical Aberrations

As light rays travel through the optical train of a fluorescence microscope described herein, they encounter optical elements, such as optical windows and optical filters made of glass and other substrates. Light rays that are incident on a glass surface of a filter will be distorted as they are refracted and pass from air into the glass, and from the glass back into the air. The refraction and distortion of light by the optical elements introduces optical aberrations which can cause a degradation in optical system performance and image quality. The optical aberrations may include astigmatism, lateral image shift, focal shift, spherical aberration, chromatic aberration, coma (comatic aberration), vignetting and variable spectral selection across the field of view. Optical aberrations can lead to image registration errors, focusing errors, and loss of image resolution and accuracy. The introduction of optical aberrations is particularly problematic when using multichannel fluorescence microscope systems relying on the alignment of multiple images captured from various detection moieties, different fluorophores and filter sets. Described herein are embodiments of an optical train for a fluorescence microscope imaging system that minimize, limit, nullify and/or correct optical aberrations.

Figure 4A:
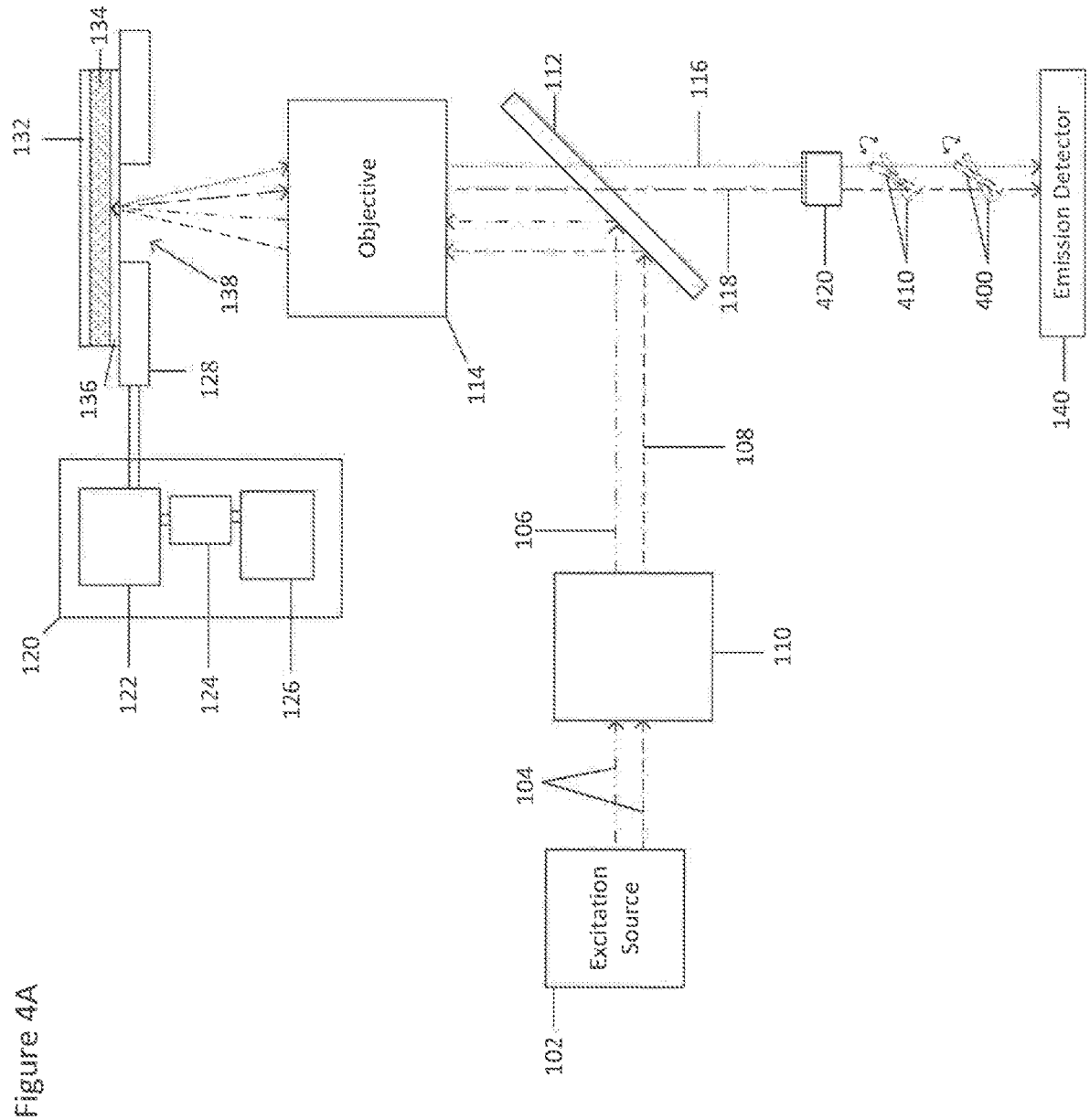
FIG. 4A is a schematic showing one embodiment of an optical train for a fluorescence microscope imaging system.
Figure 4B:
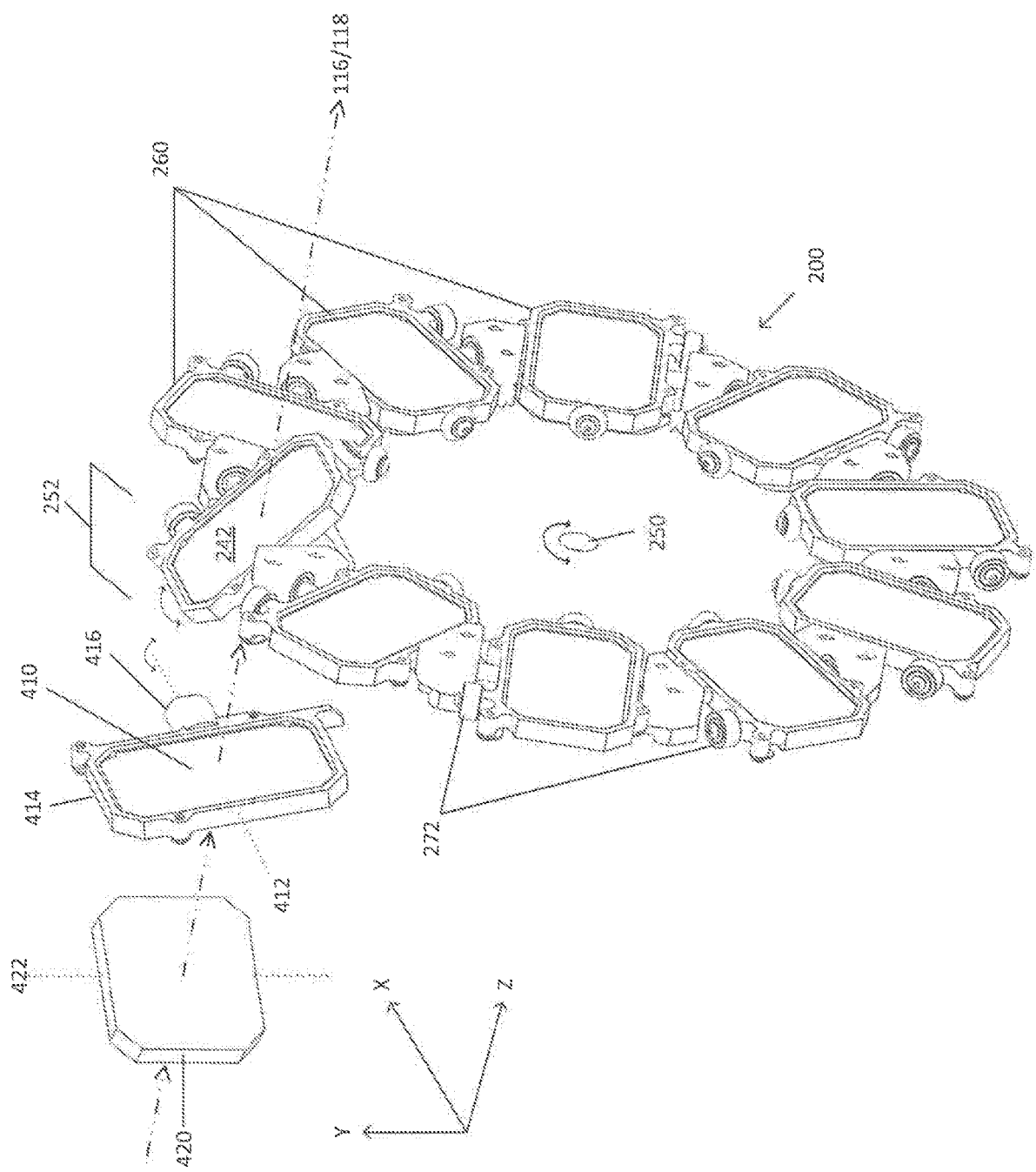
FIG. 4B is a perspective view of selected elements of an optical train for a fluorescence microscope imaging system.

With reference to FIG. 4A and FIG. 4B, embodiments of an optical train for a fluorescence microscope system may include a tiltable or variable optical filter, such as a variable interference filter 242 held by a filter changer 400 and positioned in the optical path. In some embodiments, a variable optical filter may be used to select the emission band spectrum or the emission wavelengths because it generally provides significantly better transmission efficiency than alternate approaches, such as a liquid crystal based variable filter. The excitation light rays or emission light rays are refracted and distorted as they pass through the variable interference filter 242 often leading to lateral image shift and astigmatism. When the angle of incidence of the variable interference filter 242 is changed, any resulting lateral image shift and astigmatism also changes. As disclosed herein, optical elements may be placed in the optical path to mitigate, minimize, or correct the changing optical aberration caused by the variable interference filter 242. For example, in certain embodiments, a dynamic correction optic 410 may be configured to work together with the variable interference filter 242 to create a predictable and approximately constant lateral image shift and astigmatism for any desired angle of incidence of the variable interference filter 242. In other embodiments, a fixed correction optic 420 may be positioned in the optical path and configured to substantially mitigate or minimize any astigmatism caused by the variable interference filter 242 and the dynamic correction optic 410. In other embodiments, the fixed correction optic 420, the dynamic correction optic 410 and the variable interference filter 242 may be positioned in the optical path and configured to simultaneously minimize astigmatism, lateral image shift, and focal shift.

Referring to FIG. 4B, embodiments of an optical train may comprise a dynamic correction optic 410 that is tiltable on an X-axis 412 that is substantially perpendicular to a Y-axis 422 on which the fixed correction optic 420 has been tilted. The dynamic correction optic 410 may be a flat optically transparent plate, such as an optical window formed of a desired substrate. The dynamic correction optic 410 may be positioned in the optical path of the optical train either before or after the variable interference filter 242.

In one embodiment, the dynamic correction optic 410 is supported by a dynamic optic assembly 414 having a hub 416. In certain embodiments, the hub 416 is substantially located along the X-axis 412. The dynamic correction optic 410 may be selectably tilted about the X-axis 412 manually or by engagement of a motor and/or axle with the hub 416. In particular embodiments, the angle of incidence of light in the optical path upon the surface of the dynamic correction optic 410 can be any angle of incidence ranging from approximately 0.0° to 89.9°. For example, the angle of incidence of light upon dynamic correction optic 410 can be approximately, but not limited to 0.0°, 1.0°, 2.0°, 3.0°, 4.0°, 5.0°, 6.0°, 7.0°, 8.0°, 9.0°, 10.0°, 11.0°, 12.0°, 15.0°, 20.0°, 25.0°, 30.0°, 40.0°, 45.0°, 50.0°, 60.0°, 70.0°, 75.0°, 80.0°, 85.0°, or 89.9°.

Referencing FIGS. 4A and 4B, the fixed correction optic 420 may be a flat optically transparent plate, such as an optical window formed of a desired substrate. The fixed correction optic 420 is placed in the optical path of the optical train at a fixed angle tilted about the Y-axis 422, the angle selected from any angle ranging from approximately, but not limited to 0° to 90°, 10° to 80°, 20° to 70°, 30° to 60°, and 40° to 50° relative to the optical path of the optical train. In particular embodiments, the fixed angle of the fixed correction optic 420 is any angle that may substantially compensate for one or more of the optical aberrations that may be introduced by one or more optical elements in the optical train.

As described herein, the fixed correction optic 420 is tilted on the Y-axis 422 and the dynamic correction optic 410 is tilted on the X-axis 412. With reference to FIG. 4B, the variable interference filter 242 is tilted on an X-axis that is approximately parallel to X-axis 412 and approximately perpendicular to Y-axis 422. As such, the variable interference filter 242 and the dynamic correction optic 410 are configured to tilt on approximately parallel X-axes that are approximately perpendicular to the Y-axis 422 about which fixed correction optic 420 is tilted.

The dynamic correction optic 410 and the variable interference filter 242 can be tilted independently of each other. In certain embodiments, the variable interference filter 242 can be variably tilted to any desired position to let pass or block desired wavelengths of emission light (i.e., first position, second position, third position, fourth position, and so on until the $n^{th}$ position) with each position corresponding to a different angle. Likewise, the dynamic correction optic 410 can be variably tilted to any desired position (i.e., first position, second position, third position, fourth position, and so on until the $n^{th}$ position) with each position corresponding to a different angle. The dynamic correction optic 410 and the variable interference filter 242 can have a position or angle independent of each other, such that one or both of the can be tilted to the same angle of incidence or different angles of incidence relative to one or more emission light rays.

For example, during the capture of multiple raw images, a first raw image can be obtained with the variable interference filter 242 at a first angle of incidence and the dynamic correction optic 410 at a corresponding third angle of incidence. For a second raw image, the variable interference filter 242 can be re-angled from the first angle of incidence to a second angle of incidence, while the dynamic correction optic 410 is tilted to a corresponding fourth angle of incidence. In this way, the dynamic correction optic 410 may be configured to work together with the variable interference filter 242 to create a predictable and approximately constant lateral image shift and astigmatism for any desired angle of incidence of the variable interference filter 242.

The variable interference filter 242, the dynamic correction optic 410, and the fixed correction optic 420 are not required to be positioned in the optical train in a particular order. In some embodiments, the optical path of the optical train passes through the fixed correction optic 420, the dynamic correction optic 410, and the filter wheel 200, in that order.

A. Astigmatism

During operation of a fluorescence microscope, the optical train as described herein is configured to substantially mitigate, minimize, nullify and/or cancel out the optical aberrations created by one or more of the included optical elements. With continued reference to FIGS. 4A and 4B, in one embodiment, the fixed correction optic 420 is configured to substantially mitigate and/or approximately nullify the astigmatism introduced by both the dynamic correction optic 410 and the variable interference filter 242. In another embodiment, the residual astigmatism caused or introduced by the combination of the fixed correction optic 420, the dynamic correction optic 410, and the variable interference filter 242 is approximately zero (0).

In such embodiments, the combined astigmatism caused by the dynamic correction optic 410 and the variable interference filter 242 is configured to be an approximately constant value, even as the variable interference filter 242 is selectively tilted around the X-axis. As such, for a selected angle of the variable interference filter 242, the dynamic correction optic 410 is also tilted such that their combined astigmatism approximately cancels out the astigmatism caused by the fixed correction optic 420.

B. Lateral Image Shift

In another embodiment, the sum of the lateral image shift introduced by both the dynamic correction optic 410 and the variable interference filter 242 is held approximately constant for any desired angle of incidence of the variable interference filter 242. For example, the combined lateral shift caused by the dynamic correction optic 410

(LSHFT$_{410}$) and the variable interference filter 242 (LSHFT$_{242}$) is approximately constant (LSHFT$_{Constant}$). In another form:

$$LSHFT_{Constant}=LSHFT_{410}+LSHFT_{242}$$

As such, for a selected angle of incidence of the variable interference filter 242, the combined lateral image shift caused by the dynamic correction optic 410 (LSHFT$_{410}$) and the variable interference filter 242 (LSHFT$_{242}$) is an approximately constant value, even as the variable interference filter 242 is selectively tilted around the X-axis.

C. Focal Shift

In further embodiments, the optical train as described herein is configured to substantially stabilize total focal shift caused by the focal path length introduced by the refraction through the dynamic correction optic 410 and the variable interference filter 242. When the focal shift is stabilized, the system focus can be offset by adjusting the sensor or the camera, and/or the objective, along the optical axis to achieve the desired image focus.

Telecentric Tube Lens

Infinity-corrected objectives are microscope objectives that focus at infinity. To create an image with an infinity-corrected objective, a tube lens may be used to focus the image at the image plane. One advantage to using an infinity-corrected objective with a tube lens is that there can be a space between the objective and tube lens allowing additional optical components to be inserted into the system, such as optical filters. In some embodiments described herein, a telecentric tube lens configured for use with infinity-corrected objectives may be positioned in the optical path of the fluorescence microscope to minimize, mitigate, limit, nullify or correct optical aberrations such as vignetting, chromatic aberration, spherical aberration and variable spectral selection across the field of view. The use of a telecentric tube lens may also minimize any need to digitally compensate for optical aberrations allowing the image processing to run faster by reducing CPU load, thereby leading to higher system throughput.

Figure 5:
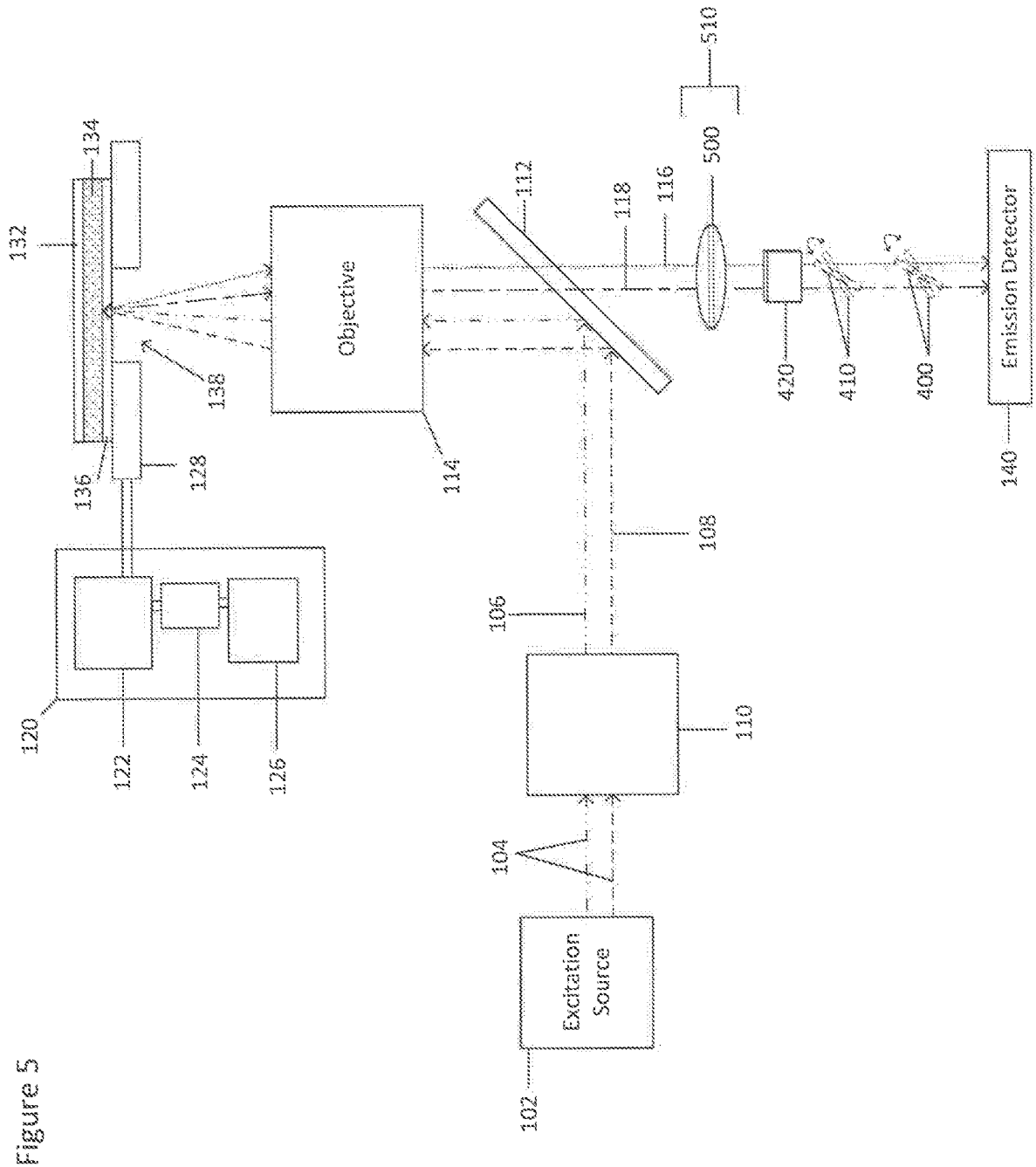
FIG. 5 is a schematic showing another embodiment of an optical train for a fluorescence microscope imaging system.

With reference to FIG. 5, embodiments of an optical train for a fluorescence microscope system may include a double telecentric tube lens 500. A telecentric tube lens is a compound lens with the entrance pupil or exit pupil at infinity. A telecentric tube lens produces chief rays that are parallel to the optic axis of the optical path. Parallel chief rays are desirable because as they pass through a tilting or variable optical filter, such as variable interference filter 242 (FIG. 4B), they produce a consistent selected spectrum across the field of view. In other words, the parallel chief rays produced by the telecentric tube lens have the same angle of incidence on the variable optical filter and therefore generally have the same spectral response to the variable optical filter.

In certain embodiments the double telecentric tube lens 500 is configured to be located at position 510, upstream from a tilting or variable interference filter, such as variable interference filter 242. The position 510 can be located in the optical path where the double telecentric tube lens 500 is telecentric in both image and object space. In such embodiments, the double telecentric tube lens 500 produces chief rays that are substantially parallel through the image space (space between the lens and the detector). In similar such embodiments, the double telecentric tube lens 500 is configured to produce chief rays that are substantially parallel and have an approximately zero (0) angle of incidence at the emission detector 140. Because the chief rays are parallel, variable spectral selection across the field of view, spherical aberration, chromatic aberration, coma (comatic aberration), and vignetting can be minimized or limited, thereby improving the image resolution and quality.

Low Incidence Filter

Generally, dichroic and polychroic filters are configured to have desired pass bands and blocking bands that are designed to operate at a standard 45° angle of incidence. However, a lower angle of incidence allows for better filter performance, including improved blocking, transmission, steeper bandpass edge, and beam collimation. Disclosed herein are embodiments of an optical train for a fluorescence microscope including a polychroic excitation filter have an angle of incidence with the excitation light that is lower or narrower than a standard 45° angle of incidence.

Figure 6:
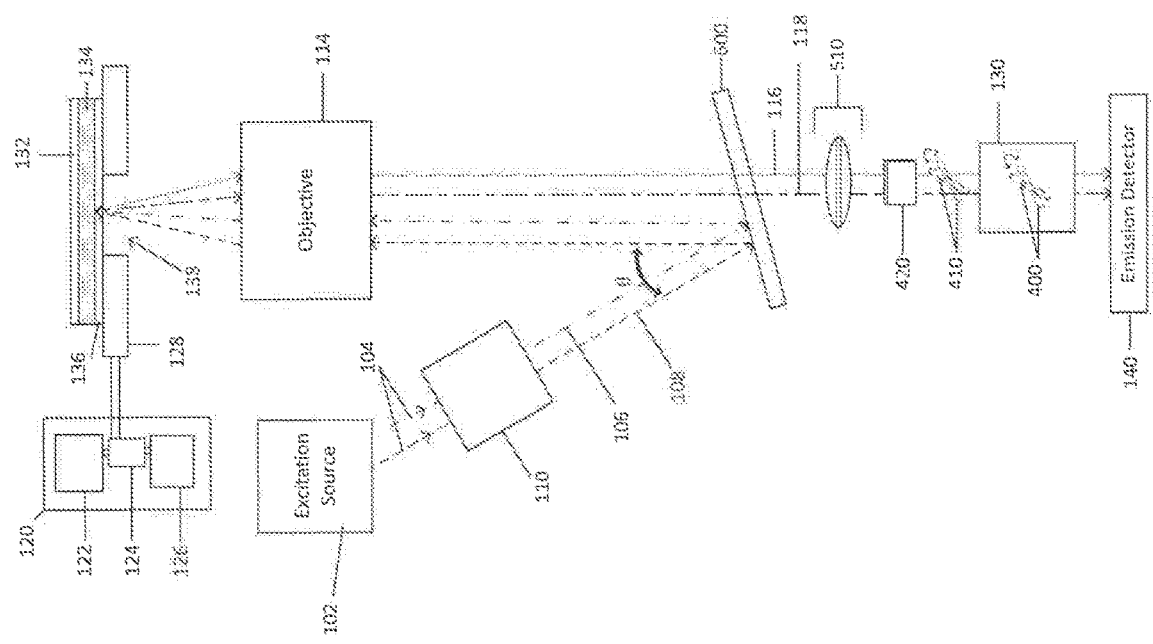
FIG. 6 is a schematic showing a further embodiment of an optical train for a fluorescence microscope imaging system.

With reference to FIG. 6, the optical path may include excitation source 102 which emits excitation light 104 directed at excitation spectrum selector 110, the excitation spectrum selector 110 comprising at least one excitation filter configured to transmit a desired excitation wavelength, such as first excitation wavelength 106 and/or second excitation wavelength 108. After the first excitation wavelength 106 and/or the second excitation wavelength 108 is transmitted by an excitation filter of the excitation spectrum selector 110 it is then directed toward a low incidence filter 600 positioned to create a low angle of incidence with the optical light path. In certain embodiments, the angle of incidence of the low incidence filter 600 can be any angle of incidence ranging from approximately 10.0° to 30.0°. For example, the angle of incidence of light upon low incidence filter 600 can be approximately, but not limited to 10.0°, 11.0°, 12.0°, 13.0°, 14.0°, 15.0°, 16.0°, 17.0°, 18.0°, 19.0°, 20.0°, 21.0°, 22.0°, 23.0°, 24.0°, 25.0°, 26.0°, 27.0°, 28.0°, 29.0°, or 30.0°.

At the chosen angle θ of incidence, the low incidence filter 600 is configured to reflect the first excitation wavelength 106 and/or the second excitation wavelength 108 into an objective 114 and to allow the transmission of the first emission wavelength signal 116 and/or the second emission wavelength signal 118. The narrow incidence filter 600 can be a dichroic, polychroic, shortpass, longpass, bandpass, bandstop, multi-pass, or any desired filter.

Spectral Edge Detection

When multiple detection moities or fluorophores are used for multichannel, multicolor fluorescence microscopy, spectral overlap or cross-talk can limit the ability to distinguish one detection moiety signal from another. As disclosed herein, spectral edge detection is a process by which individual detection moieties can be distinguished from a plurality of detection moieties (i.e., during multiplexing), such as by distinguishing the detection moieties orthogonally—in that there is little ambiguity as to which detection moiety is being detected and/or imaged. Improvements to the performance of spectral edge detection can be realized by minimizing, limiting and/or nullifying optical aberrations in the optical train used for multichannel, multicolor fluorescence microscopy.

For some embodiments of a fluorescence microscope described herein, raw images are acquired by an emission detector at a selected wavelength of the emission spectra. Each raw image may include a total selected emission spectra signal. Each total signal may comprise one or more signals from one or more detection moieties. Each total signal can further comprise a signal due to background or autofluorescence. For spectral edge detection, a feature of a signal of interest, such as a signal from a detection moiety of interest, can be distinguished in the presence of a featureless signal (i.e., the signal has an unknown value and/or structure), such as from background, autofluorescence, or a non-desired detection moiety. In other words, spectral edge detection determines the contribution of a detection moiety of interest across a plurality of signals (or images) composed of contributions from a plurality of detection moieties having at least partially overlapping spectra by eliminating the contributions from the non-desired detection moieties across the plurality of the signals (or images) when the intensities (and therefore the respective contributions) of the detection moieties are unknown.

Spectral edge detection can also account for minor changes in signals, for example, when detecting a detection moiety against a reference detection moiety or when incorporating detection moieties which have emission shifts based on one or more factors, whether intentional (e.g., detection moieties which detect sample variables, including, for example, oxygen concentration, metal ion concentration, environmental changes, being endocytosed, being exocytosed, or the like) or whether unintentional (e.g., variable pH of the sample or reagents causes detection moieties to have an emission shift).

Spectral edge detection uses an edge (e.g., a trailing edge or a leading edge) of an emission or excitation spectrum curve, such as an emission or excitation spectrum curve for a detection moiety, to identify a single detection moiety within a plurality of spectrally-overlapping detection moieties. For example, two raw images can be obtained along the same leading or trailing spectral edge of the detection moiety emission spectrum curve; two raw images can be obtained along different leading and trailing spectral edges of the detection moiety emission spectrum curve; or, one raw image can be obtained along the leading or trailing spectral edge of the detection moiety emission spectrum curve and one raw image can be obtained at the peak emission of the detection moiety emission spectrum curve.

Spectral edge detection can also utilize a combination of the examples and methods discussed herein for a single detection moiety or for a plurality of detection moieties. For example, when using a plurality of detection moieties, a first detection moiety can be detected with signals from a peak and a leading spectral edge; a second detection moiety can be detected with signals from a leading spectral edge; a third detection moiety can be detected with signals from a leading spectral edge and a trailing spectra edge. Furthermore, spectral edge detection can utilize a curve for a first detection moiety and a line for a second detection moiety, such that at least a portion of the line falls under the curve, with data points of each emission spectrum (for example, signals at given emission/excitation wavelengths).

FIG. 7A shows an emission spectrum 702 of a first detection moiety. The emission spectrum 702 includes a leading spectral edge 704 and a trailing spectral edge 706. In other words, the leading spectral edge 704 is a portion of the emission spectrum 702 to the left of, or with shorter wavelengths than, a peak emission 708; the trailing spectral edge 706 is a portion of the emission spectrum 702 to the right of, or with longer wavelengths than, the peak emission 708. Though the emission spectrum 702 is shown, the spectrum can also be an excitation spectrum.

FIG. 7B shows an emission spectrum 710 of a second detection moiety. The emission spectrum 710 includes a leading spectral edge 712 and a trailing spectral edge 714. In other words, the leading spectral edge 712 is a portion of the emission spectrum 710 to the left of, or with shorter wavelengths than, a peak emission 716; the trailing spectral edge 714 is a portion of the emission spectrum 710 to the right of, or with longer wavelengths than, the peak emission 716. Though the emission spectrum 710 is shown, the spectrum can also be an excitation spectrum.

FIG. 7C shows an emission spectrum 720 of a third detection moiety. The emission spectrum 720 includes a leading spectral edge 722 and a trailing spectral edge 724. In other words, the leading spectral edge 722 is a portion of the emission spectrum 720 to the left of, or with shorter wavelengths than, a peak emission 726; the trailing spectral edge 724 is a portion of the emission spectrum 720 to the right of, or with longer wavelengths than, the peak emission 726. Though the emission spectrum 720 is shown, the spectrum can also be an excitation spectrum.

In one embodiment, any of the methods or systems can be used to detect a stain or detection moiety while removing background or autofluorescence from an image or a signal. For example, two or more raw images of a first detection moiety are provided, such that at least one of the images is at a lower end of a spectral edge of the first detection moiety and at least one the images is at a higher end of the spectral edge of the first detection moiety. At least one of the raw images includes a signal caused by autofluorescence or background. A first final image of the first detection moiety is provided, such that the first final image based on the raw images from the first detection moiety, and the first final image does not include the signal caused by the autofluorescence or background. This can be performed for any number of detection moieties to remove background or autofluorescence from any images.

In FIGS. 8A and 8B, a fourth detection moiety (as depicted by emission spectrum 804) is used as an example for the method by which an individual detection moiety is distinguished over background or autofluorescence. It should be noted, however, that the method discussed herein is not so limited and can also be implemented on the first, second, and/or third detection moieties (as depicted by emission spectra 702, 710, 720) or any other appropriate detection moiety.

FIG. 8A shows the emission spectrum 804 and a background signal 802. The background signal 802 is expected to be relatively unvarying with respect to the signal of interest and therefore depicted as a constant (i.e., a straight line) with a known value. Additionally, the relative intensities between the emission spectrum 804 and the background signal 802 are unknown.

For clarification purposes, FIGS. 8B-9E depict images $I_1$-$I_{18}$ obtained from an indicated single wavelength. However, the images $I_1$-$I_{18}$ can be obtained across a given bandwidth (i.e., up to 1, 2, 3, 4, 5, 6, 7, 8, 9, 10, 11, 12, 15, 20, 25, 30, 40, 50, 60, 70, 75, 80, 90, 100, 150, 200, or more nm), such that the images (as denoted by the dot-dot-dash lines) denote the average signal across the respective bandwidths. Additionally, though raw images are obtained, the signals (for example, the total signals comprising the individual signals) are from pixels in the raw images corresponding to an identical location of the sample between images. For example, Point A is a given location on or within the sample being imaged. A first pixel representing Point A in a first raw image comprises a first total signal. A second pixel representing Point A in a second raw image comprises a second total signal. Using one or more of the methods discussed herein, the first and second total signals of the first and second pixels of the first and second raw images, respectively, are assessed and/or compared to determine the contribution(s) of the individual detection moiet(ies).

FIG. 8B shows raw images $I_1$ and $I_2$ including first and second signals $S_1$ and $S_2$, respectively, obtained during imaging. The signals $S_1$ and $S_2$ denote the total contributions of the fourth detection moiety and the background 802. Raw image $I_1$ includes the first signal $S_1$ on a lower end of the leading spectral edge; and raw image $I_2$ is taken at a higher end of the leading spectral edge. To identify the fourth detection moiety (as shown by the emission spectrum 804), the raw images $I_1$ and $I_2$, are analyzed and the relative contribution of the fourth detection moiety between first and second signals $S_1$ and $S_2$ is determined by processing, comparing, and/or analyzing the change in signal with any appropriate mathematical, computational, or algebraic process or transformation, including, without limitation, subtraction, derivatives, or combinations thereof. A final image can then be provided depicting the fourth detection moiety based on the processing, comparing, and/or analyzing.

Spectral edge detection can be implemented for each detection moiety within the plurality of detection moieties, thereby allowing for multiplexing of a sample or fraction thereof with any desired number of detection moieties. In one embodiment, at least two detection moieties can be used for multiplexing. In one embodiment, any appropriate number of detection moieties can be used, including without limitation, 2, 3, 4, 5, 6, 7, 8, 9, 10, 11, 12, 16, 20, 24, 28, 30, 32, 40, 50, 60, 70, 80, 90, or 100.

Spectral edge detection can be implemented for detection moieties having spectral offsets, where the spectral offsets are spectral differences on the comparable spectral edge or at the spectral peaks. In one embodiment, this process can be implemented for detection moieties having differences in spectral offsets of less than or equal to 50 nm. In one embodiment, this process can be implemented for detection moieties having differences in spectral offsets of less than or equal to 10 nm. In one embodiment, this process can be implemented for detection moieties having differences in spectral offsets of 1-50 nm. In one embodiment, this process can be implemented for detection moieties having differences in spectra of 10-50 nm. In one embodiment, this process can be implemented for detection moieties having differences in spectral offsets of approximately, but not limited to 1, 2, 3, 4, 5, 6, 7, 8, 9, 10, 11, 12, 15, 20, 25, 30, 40, 50, 60, 70, 75, 80, 90, or 100 nm. In one embodiment, the difference between successive spectra (such as at the peak) can be the same (e.g., first and second detection moieties are separated by 10 nm and second and third detection moieties are separated by 10 nm). In one embodiment, the differences between successive spectra (such as at the peak) can be different (e.g., first and second detection moieties are separated by 10 nm and second and third detection moieties are separated by 25 nm).

In one embodiment, the signal contributions of each detection moiety (for example, by way of the contribution or subtraction coefficients) can be determined with at least two raw images, such as by cancelling out or nullifying the signal contributions provided by the non-interested detection moiety (i.e., a first detection moiety is the non-interested detection moiety and a second detection moiety is the detection moiety of interest; and/or, then the first detection moiety is the detection moiety of interest and the second detection moiety is the non-interested detection moiety) or background/autofluorescence. Any number of raw images equal to or greater than 2 can be obtained for spectral edge detection, including, without limitation, 3, 4, 5, 6, 7, 8, 9, 10, 11, 12, 15, 20, 25, 30, 40, 50, 60, 70, 75, 80, 90, 100, or more.

For clarity purposes regarding FIGS. 9A-9E, the emission spectrum 702 of the first detection moiety is also designated by "A"; the emission spectrum 710 of the second detection moiety is also designated by "B"; and, the emission spectrum 720 of the third detection moiety is also designated by "C." The subscripts following A, B, or C in this description designate the image to which the detection moiety of interest is contributing intensity. For example, a data point $A_3$ denotes the contribution of A (or, the first detection moiety) within raw image $I_3$, as shown by the data point $A_3$ on the emission spectrum 702. So, $A_3$-$A_{18}$ denote the contributions of A (or, the first detection moiety) in raw images $I_3$-$I_{18}$, respectively; $B_3$-$B_{18}$ denote the contributions of B (or, the second detection moiety) in raw images 13-118, respectively; and, $C_3$-$C_{18}$ denote the contributions of C (or, the third detection moiety) in raw images 13-118, respectively.

Figure 9A:
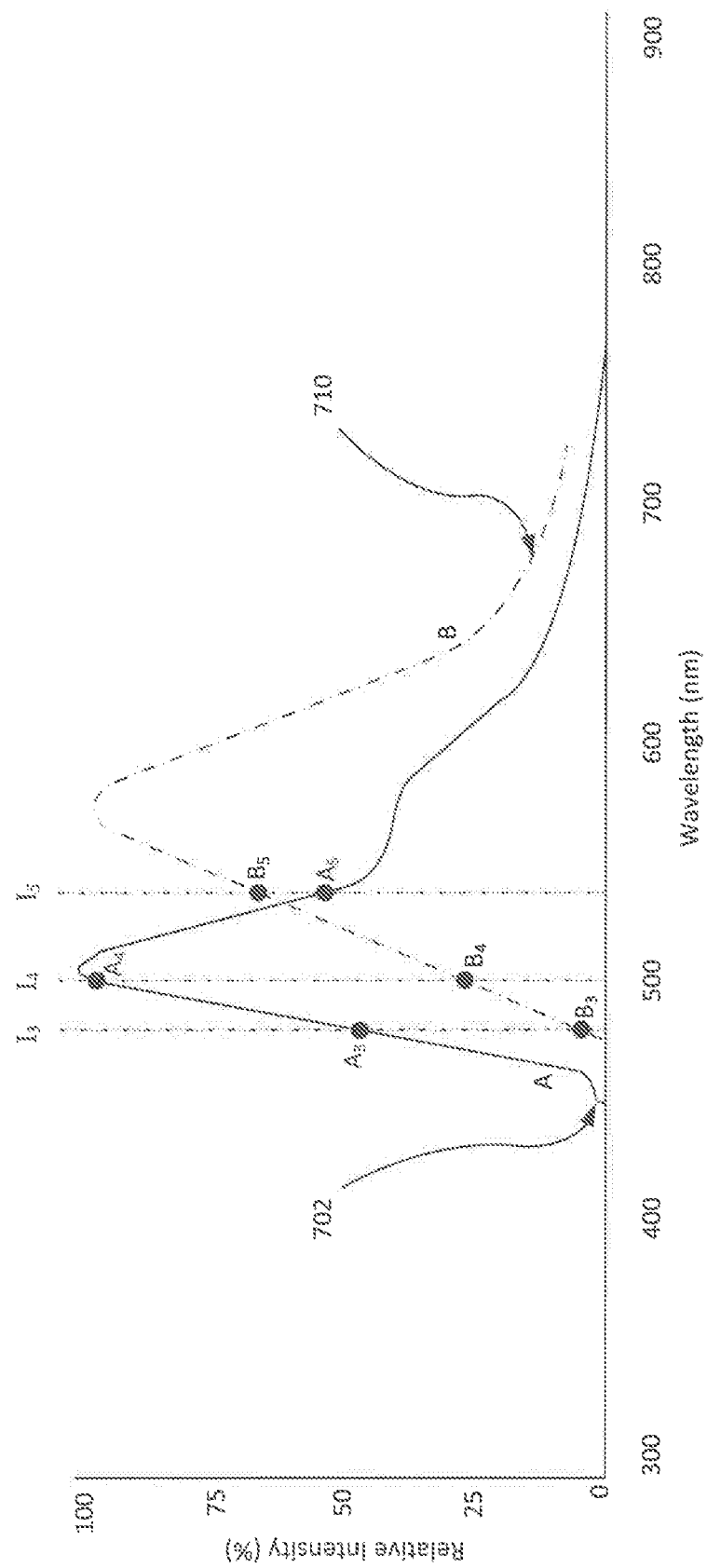

FIG. 9A shows the emission spectra 702 of the first detection moiety and the emission spectra 710 for the second detection moiety. Raw images $I_3$, $I_4$, and $I_5$ are obtained at the indicated wavelength locations on the emission spectra 702 and the emission spectra 710. Raw image $I_3$ is taken at a lower end of the leading spectral edge 704 of emission spectra 702; raw image $I_4$ is taken at a higher end of the leading spectral edge 704 of emission spectra 702, which also overlaps with a lower end of the leading spectral edge 712 of emission spectra 710; and, raw image $I_5$ is taken at a higher end of the leading spectral edge 712 of emission spectra 710. Though the emission spectra 702, 710 are shown, the spectra can also be excitation spectra.

In one embodiment, more than three raw images can be obtained. In one embodiment, each of the raw images are used to analyze one and only one of the detection moieties. In one embodiment, one or more of the raw images are used to analyze at least two of the detection moieties (i.e., there is an overlap). In one embodiment, none of the raw images between the first and second detection moieties are the same (i.e. all images are distinct). In one embodiment, at least one of the raw images of the first detection moiety and at least one of the raw images of the second detection moiety is the same image.

In one embodiment, a raw image taken at the higher end of the trailing spectral edge can include the higher end of the leading spectral edge, and vice-versa (i.e., a raw image taken at the higher end of the leading spectral edge can include the higher end of the trailing spectral edge). In one embodiment, a raw image taken at the higher end of the particular spectral edge does not include the higher end of the opposing spectral edge (i.e., a raw image taken at the higher end of the trailing spectral edge does not include the higher end of the leading spectral edge; or a raw image at the higher end of the leading spectral edge does not include the higher end of the trailing spectral edge).

To identify a first detection moiety (as shown by the emission spectrum 702) and a second detection moiety (as shown by the emission spectrum 710), the raw images $I_3$, $I_4$, and $I_5$ are analyzed and the relative contributions of the first and second detection moieties are determined. For example, the relative contributions can be determined by any appropriate mathematical, computational, or algebraic process or transformation, including, without limitation, subtraction, derivatives, integrals, etc., or combinations thereof. A final image of the first detection moiety is then provided based on the analysis of raw images $I_3$ and $I_4$, such as the relative contribution of the first detection moiety across the raw images $I_3$ and $I_4$. A final image of the second detection moiety is then provided based on the analysis of raw images $I_4$ and $I_5$, such as the relative contribution of the second detection moiety across the raw images $I_4$ and $I_5$.

FIG. 9B shows the example first and second emission spectra similar to that of FIG. 3A, except having obtained raw images $I_6$, $I_7$, and $I_8$. Raw images $I_6$ and $I_8$ are taken at points where the mission intensity of the first detection moiety has the same or substantially the same value, and the emission intensity of the second detection moiety is different between the images. Raw image $I_7$ is take at a point such that the at least three data points for the second detection moiety form a line.

Figure 9C:
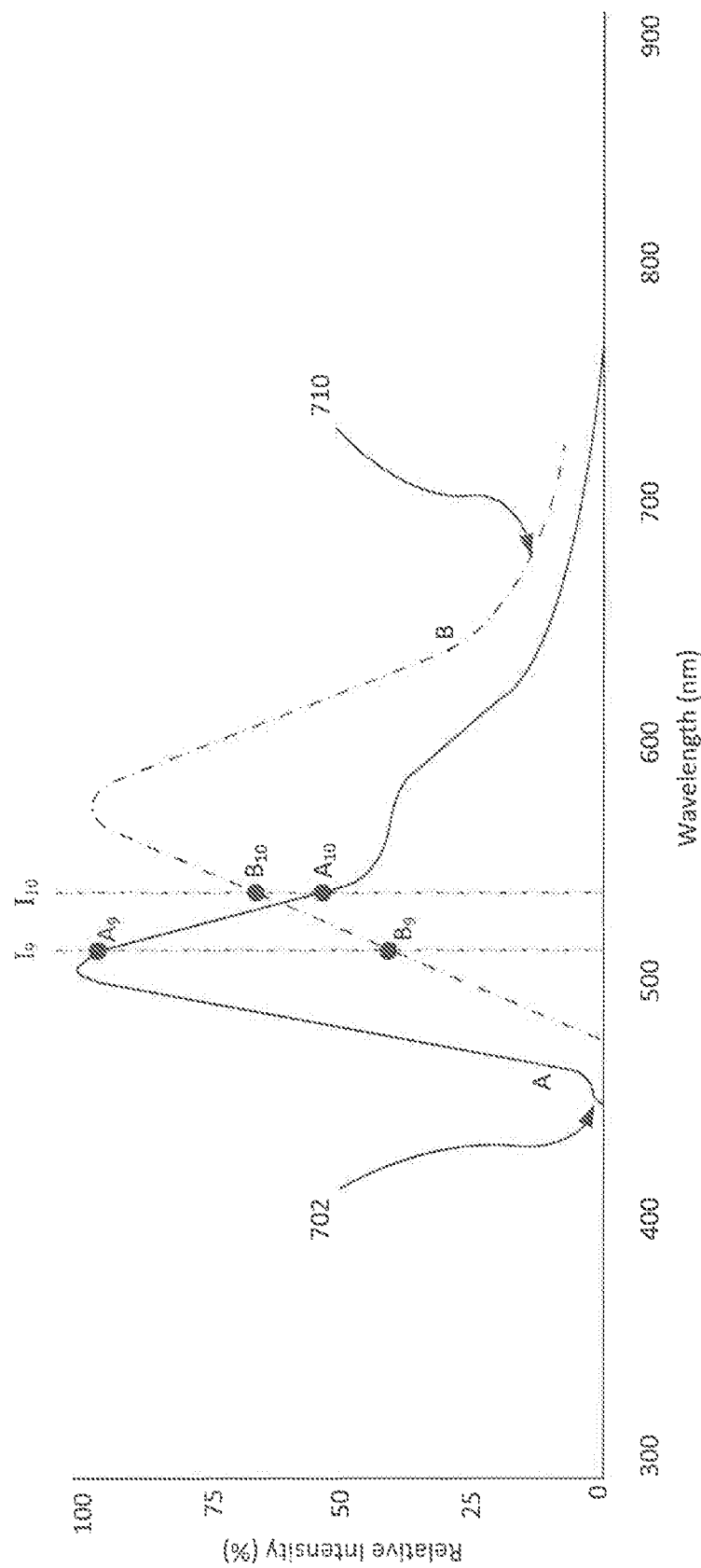

FIG. 9C shows the example first and second emission spectra similar to that of FIG. 9A, except having obtained raw images $I_9$ and $I_{10}$. Raw image $I_9$ is taken at point where a higher end of the trailing spectral edge of the first detection moiety overlaps with a lower end of the leading spectral edge of the second detection moiety. Raw image $I_{10}$ is taken at a point where a lower end of the trailing spectral edge of the first detection moiety overlaps with a higher end of the leading spectral edge of the second detection moiety. As shown in FIG. 9C, the trailing edge of the first detection moiety overlaps with the leading edge of the second detection moiety such that raw image $I_9$ includes the higher end of the trailing spectral edge of the first detection moiety and the lower end of the leading spectral edge of the second detection moiety, and raw image $I_{10}$ includes the lower end of the trailing spectral edge of the first detection moiety and the higher end of the leading spectral edge of the second detection moiety. In one embodiment, the leading edge of the first detection moiety overlaps with the trailing edge of the second detection moiety.

FIG. 9D shows the example first and second emission spectra similar to that of FIG. 9C, except having obtained raw images $I_{11}$-$I_{14}$. Raw images $I_{12}$ and $I_{13}$ are taken at the peaks of emission spectrum 702 and emission spectrum 710, respectively. The peak emission of a spectrum can be used to determine the relative contribution of a detection moiety between raw images, wherein the other raw image is in a spectral edge (leading or trailing) of the emission spectrum of the detection moiety for which the peak emission is acquired.

In one embodiment, two or more raw images of a first emission spectrum are obtained, wherein at least one of the images is at a lower end of a spectral edge of the first emission spectrum and at least one the images is at a higher end of the same spectral edge of the first emission spectrum. Two or more raw images of a second emission spectrum are obtained, wherein at least one of the images is at a lower end of a spectral edge of the second emission spectrum and at least one of the images is at a higher end of the same spectral edge of the second emission spectrum. A first final image of a first detection moiety (as depicted by the first emission spectrum) and a second final image of a second detection moiety (as depicted by the second emission spectrum) are provided, wherein the first and second final images are based on the raw images from the first and second detection moieties. In one embodiment, at least one of the raw images of the first and second emission spectra is the same image. For example, the second image of the first emission spectrum (at the higher end of the first emission spectrum's spectral edge) is the same image as the first image of the second emission spectrum (at the lower end of the second emission spectrum's spectral edge).

Though two detection moieties are discussed, this process can be used for any number of detection moieties. In other words, two or more raw images of a $n^{th}$ emission/excitation spectrum are obtained, wherein at least one of the images is at a lower end of a spectral edge of the $n^{th}$ emission/excitation spectrum and at least one the images is at a higher end of the spectral edge of the $n^{th}$ emission/excitation spectrum, and wherein n is greater than or equal to 1 (i.e., 1, 2, 3, 4, 5, 6, 7, 8, 9, 10, 11, 12, 16, 20, 24, 28, 30, 32, 40, 50, 60, 70, 80, 90, 100, or more). This process is then repeated for at least one more emission/excitation spectrum.

In one embodiment, to determine signal contribution by individual detection moieties having overlapping spectra, at least three data points of one detection moiety are to be obtained, such that the three data points form a curve; and, at least two data points of another detection moiety are to be obtained, such that the two data points form a line. The determination as to which detection moiety requires the data points to form the curve or the data points to form the line are based on the relative spectral edges. In other words, when using the same spectral edge (i.e., leading or trailing) of different emission spectra, the emission spectrum having at least a portion of the same spectral edge fall under the emission spectrum of the other emission spectrum only requires at least two data points. The at least two data points (i.e., those forming the line) can be used to determine the contribution of the detection moiety whether in the presence or absence of the curve provided by the other detection moiety; and, additionally, the at least three data points (i.e., those forming the curve) can be used to determine the contribution of the other detection moiety whether in the presence or absence of the line provided by the initial detection moiety.

In one embodiment, to determine signal contribution by individual detection moieties having overlapping spectra, at least three data points of one detection moiety are acquired, such that the three data points form a curve; and, at least three data points of another detection moiety are acquired, such that the three data points form a curve or line. For example, in referring back to FIG. 9D, the data points of $B_{12}$-$B_{14}$ can be incorporated into the following equation:

$$C_B = S_{B13} - \frac{1}{2}(S_{B12} + S_{B14})$$

where $C_B$ is the curvature (e.g., second derivative) of emission B, $S_{B12}$ is the signal intensity of emission B at the wavelength of image $I_{12}$, $S_{B13}$ is the signal intensity of emission B at the wavelength of image $I_{13}$, and $S_{B14}$ is the signal intensity of emission B at the wavelength of image $I_{14}$. The data points of $A_{12}$-$A_{14}$ can be incorporated into the following equation:

$$C_A = S_{A13} - \frac{1}{2}(S_{A12} + S_{A14})$$

where $C_A$ is the curvature (e.g., second derivative) of emission A, $S_{A12}$ is the signal intensity of emission A at the wavelength of image $I_{12}$, $S_{A13}$ is the signal intensity of emission A at the wavelength of image $I_{13}$, and $S_{A14}$ is the signal intensity of emission A at the wavelength of image $I_{14}$. The detection moieties are distinguishable from each other because a stronger curvature (i.e., more positive (for example, +5 is stronger than +2; as another example, +4 is stronger than −1) or more negative (for example, −6 is stronger than −1; as another example, −5 is stronger than +2)) at those emission wavelengths corresponds to individual detection moieties. In other words, detection moieties have stronger curvatures across different emission wavelengths. For example, Alexa 647 has a stronger curvature across 660 nm, 670 nm, and 680 nm than Alexa 594 across the same emission wavelengths. Alexa 594 has a stronger curvature across 609 nm, 619 nm, and 632 nm than Alexa 647 across the same emission wavelengths. Therefore, based on the curvatures across 660 nm, 670 nm, and 680 nm, Alexa 647 can be distinguished from Alexa 594; and, based on the curvatures across 609 nm, 619 nm, and 632 nm, Alexa 594 can be distinguished from Alexa 647.

FIG. 9E depicts three emission spectra 702, 710, 720 (A, B, C) within four images 115-118. A leading edge of emission B is underneath a leading edge of emission A. Therefore, at least three data points are obtained for emission A (e.g., $A_{15}$-$A_{17}$; or, $A_{15}$, $A_{16}$, $A_{18}$), and at least two data points are obtained for emission B (e.g., $B_{15}$ and $B_{16}$; or, $B_{15}$ and $B_{17}$; or, $B_{16}$ and $B_{17}$). Additionally, a leading edge of emission C is underneath a leading edge of emission B. Therefore, at least three data points are obtained for emission B (e.g., $B_{15}$, $B_{17}$, $B_{18}$; or, $B_{16}$-$B_{18}$), and at least two data points are required for emission C (e.g., $C_{16}$ and $C_{17}$; or, $C_{17}$ and $C_{18}$; or, $C_{16}$ and $C_{18}$). The respective data points for the emissions A-C can be used to determine the respective contributions of the detection moieties.

In one embodiment, two or more raw images at two distinct emission wavelengths of a first emission spectrum are obtained, wherein at least one of the images is in a leading spectral edge or a trailing spectral edge of the first emission spectrum and at least one of the images is in the trailing spectral edge or the leading spectral edge of the first emission spectrum. In other words, the two or more raw images are in different spectral edges of the same emission spectrum (i.e., at least one raw image in a leading spectral edge and at least one raw image in a trailing spectral edge, wherein the leading spectral edges are in an emission spectrum of one detection moiety).

As shown in FIG. 9E, signals of emission spectra A and B are acquired via raw images on different spectral edges of their emission spectra ($A_{15}$ and $A_{17}$ for emission spectrum A; and, $B_{15}$/$B_{16}$/$B_{17}$ and $B_{18}$ for emission spectrum B). The intensities of the signals on the different spectral edges can be equal or not equal (for example, the intensity can be greater on one spectral edge and less on the other spectral edge).

In one embodiment, two or more raw images of a first emission spectrum are obtained, wherein at least one of the raw images is in a leading spectral edge or a trailing spectral edge of the first emission spectrum, at least one of the raw images is in the trailing spectral edge or the leading spectral edge of the first emission spectrum, and at least one of the raw images is at the peak intensity wavelength. In other words, two or more raw images are in different spectral edges of the same emission spectrum and one raw image is at the peak intensity wavelength. As shown in FIG. 9E, emission spectrum A provides signals on different spectral edges of its emission spectra ($A_{15}$ and $A_{17}$ for emission spectrum A) and a signal at the peak intensity wavelength ($A_{16}$ for emission spectrum A).

Though FIG. 9E shows raw images acquired from emission spectrum A in the leading spectral edge, the peak emission, and the trailing spectral edge, this is not intended to be limited to only one emission spectrum. The same types of raw images can be acquired for as many emission spectra as desired.

In one embodiment, change in signal intensity (i.e., pixel levels) can be used to identify a detection moiety.

In one embodiment, such as when representative points of the emission spectrum are obtained, the rate of change or the change in signal intensity can be determined based on the trailing edge of the spectrum. In one embodiment, such as when representative points of the emission spectrum are obtained, the rate of change or the change in signal intensity can be determined based on the leading edge of the spectrum.

In one embodiment, such as when representative points of the excitation spectrum are obtained, the rate of change or the change in intensity can be determined based on the trailing edge of the spectrum. In one embodiment, such as when representative points of the excitation spectrum are obtained, the rate of change or the change in intensity can be determined based on the leading edge of the spectrum.

In one embodiment, the change in signal intensity can be compared against an expected value. For example, the change in intensity can be the expected value+/−(plus or minus) up to 0.01%, 0.02%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 2%, 5%, 10%, 15%, 20%, 25%, 30%, 33%, 35%, 40%, 45%, 50%, 55%, 60%, 65%, 70%, 75%, 80%, 85%, 90%, 95%, or 99%. In one embodiment, the change in signal intensity can be compared against a threshold. In one embodiment, the change in signal intensity can be positive or negative, such that the positive or negative change identifies the desired detection moiety.

In one embodiment, a threshold can be applied, such as during image processing and analysis, to determine whether the signal is caused by the desired detection moiety, an undesired detection moiety, noise, or background.

In one embodiment, when a change in signal intensity between the first and second images, such as at a desired or pre-determined wavelength, is equal to or greater than a first threshold value, the pixel or signal is "kept on" for the resulting image for analysis; whereas when a change in signal between the first and second images is less than the first threshold value, the pixel or signal is "turned off" for the resulting image for analysis.

In one embodiment, a first emission derivative of the emission spectrum 702 of the first detection moiety can be obtained; and, a second emission derivative of the emission spectrum 710 of the second detection moiety can be obtained. Though a first-order derivative is discussed, any higher-order derivative can be calculated when it is desirous to do so.

In one embodiment, such as when representative points of the emission spectrum are obtained, the rate of change can be greater than or equal to a threshold value. In one embodiment, such as when representative points of the emission spectrum are obtained, the change in intensity can be positive, positive by at least a threshold amount, and/or positive by a certain multiple of the first emission. In one embodiment, such as when representative points of the excitation spectrum are obtained, the rate of change can be less than or equal to a threshold value (i.e. more negative— for example −5 is less than −3). In one embodiment, such as when representative points of the excitation spectrum are obtained, the change in intensity can be negative, negative by at least a threshold amount, and/or negative by a certain multiple of the first excitation.

As an example, Δx (the change in emission wavelength) is 10 nm and Δy (the change in emission intensity) is 50%, the slope is 50%/10 nm, or 5%/nm. When comparing the first and second images, an increase of intensity of at least 5 times between respective pixels can be attributed to the first detection moiety and the pixel is "kept on"; whereas an increase of intensity of less than 5 times between respective pixels can be attributed to something other than the first detection moiety (e.g., background) and the pixel is "turned off." The example is not intended to be limited to values and/or percentages. The first threshold value can include a range based on the anticipated or expected change of emission intensity. For example, the first threshold value can be the slope+/−(plus or minus) up to 0.01%, 0.02%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 2%, 5%, 10%, 15%, 20%, 25%, 30%, 33%, 35%, 40%, 45%, 50%, 55%, 60%, 65%, 70%, 75%, 80%, 85%, 90%, 95%, or 99%.

The slope satisfies the condition given by:

$$\text{slope} = \frac{\text{intensity of the second emission} - \text{intensity of the first emission}}{\text{wavelength of the second emission} - \text{wavelength of the first emission}}.$$

In one embodiment, when exciting the first detection moiety (and thereby obtaining a first image), a wavelength of a first excitation light can be selected to not excite the second detection moiety. Then, a wavelength of a second excitation light can also be selected to excite the first detection moiety (thereby providing a second image) and to not excite the second detection moiety. The first and second images can be processed and compared to obtain the change of emission intensity (in other words, the slope, or y/x) based on the emissions of the first detection moiety due to the change in excitation wavelengths.

In one embodiment, at least one of the excitation lights can stimulate one or more detection moieties. However, the resulting slopes, as discussed below, can be used to remove the signal of one or more non-desired detection moieties.

In one embodiment, two or more images, resulting from the two or more excitation wavelengths can be compared and processed to calculate the desired slope. The resulting slope can be used to keep the signal on or turn the signal off in a final image. In one embodiment, two or more signals, resulting from the two or more excitation wavelengths can be compared and processed to calculate the desired slope. The resulting slope can be used to keep the signal on or turn the signal off in a final image.

In one embodiment, the first- or higher-order derivative can be calculated for each detection moiety spectral edge. In one embodiment, the spectral edge of the respective detection moieties can be used to differentiate between the emissions of the different detection moieties.

In one embodiment, the minimum number of raw images is n, where n is the number of detection moieties. For example, a first raw image can be obtained at a higher end of a trailing edge of a first emission spectrum and at a lower end of a leading edge of a second emission spectrum. A second raw image can be obtained at a lower end of the trailing edge of the first emission spectrum and at a higher end of the leading edge of the second emission spectrum. The first and second raw images can be processed and/or analyzed to provide a first final image of a first detection moiety (as depicted by the first emission spectrum) and a second final image of a second detection moiety (as depicted by the second emission spectrum). Though the emission spectra are discussed, this embodiment can be implemented on excitation spectra.

In one embodiment, the minimum number of raw images is n+1, where n is the number of detection moieties.

In one embodiment, all of the raw and final images of the first and second detection moieties are displayed to an end user or operator, such as on a screen (e.g., the screen of at least one of a phone, a tablet, a computer, a television, a PDA, a handheld device, or the like). In one embodiment, at least one of the raw images of the first and/or second detection moieties is displayed. In one embodiment, at least one of the final images of the first and/or second detection moieties is displayed. In one embodiment, none of the raw images are displayed but at least one of the final images is displayed. In one embodiment, none of the raw images are displayed but all of the final images are displayed.

The embodiments for acquiring signals (for example, same spectral edges, different spectral edges, peak and one spectral edge, peak and two spectral edges, etc.) are not intended to be limited to the emission spectrum specifically discussed for the example acquisition. Rather, the signal acquisition can apply to one or more emission spectra, wherein all emission spectra have the same acquisition (for example, same spectral edges, different spectral edges, peak and one spectral edge, peak and two spectral edges, etc.), at least two emission spectra have the same acquisition, or no emission spectra have the same acquisition.

To obtain the raw images, the imaging can be done with a flow cytometer or a microscope, such as a fluorescence microscope, a scanner, or the like. Imaging can be done in, conventional epifluorescence, light sheet microscopy, super resolution microscopy, and confocal microscopy.

Any of the images or files, whether raw or processed, can be stored in any appropriate storage medium at any point during the performance of any embodiment of the present invention. The storage medium includes, but is not limited to, one or more of a hard disk, a random-access memory (RAM), a read only memory (ROM), a storage of distributed computing systems, an optical disk (such as a compact disc, digital versatile disc, or Blu-ray Disc), a flash memory device, a memory card, or the like.

Embodiments of the invention include a non-transitory computer readable medium which can store instructions for performing the above-described methods and any steps thereof, including any combinations of the same. For example, the non-transitory computer readable medium can store instructions for execution by one or more processors or similar devices.

Embodiments of the invention include two or more non-transitory computer readable media which can store instructions for performing the above-described methods and any steps thereof, including any combinations of the same. For example, the instructions for execution can be split amongst two or more processors or similar devices.

Further embodiments of the present invention can also include a computer or apparatus (e.g. a phone, a tablet, a PDA, or the like) which reads out and executes computer executable instructions, such as a non-transitory computer-readable medium, recorded or stored on a storage medium (which may be the same as or different than the storage medium for storing images or files, as discussed above), to perform the functions of any embodiment. The computer may include one or more of a central processing unit (CPU), micro processing unit (MPU), or other circuitry, and may include a network of separate computers or separate computer processors. The computer executable instructions may be provided to the computer, for example, from a network or the storage medium.

The computer or apparatus can also be configured to display, such as on a monitor or screen, any of the images or files, whether raw or processed.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially, graphically, or numerically relative terms, such as "under", "below", "lower", "over", "upper", "higher", and the like, may be used herein for ease of description to describe one element or feature's relationship to another element(s) or feature(s) as illustrated in the figures. It will be understood that the spatially relative terms are intended to encompass different orientations when in use or operation in addition to the orientation depicted in the figures. For example, if a device, system, or method, as depicted in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise. Additionally, "lower", "higher", and the like are used to depict elements, features, information, or the like which, relative to each other or at least other elements, features, information, or the like are further down or further up a chart, graph, or plot, or are lesser or greater in value or intensity.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention. Additionally, though "first" and "second" are used, the terms are not intended to limit various features/elements to only one or two. Rather, three (i.e., third), four (i.e., fourth), or more may be included or used where appropriate or desirous to do so.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

What is claimed is:

1. An imaging system comprising:
   at least one tiltable filter assembly comprising an optical filter configured to be positioned in an optical path of the imaging system;
   a dynamic correction optic configured to be positioned in the optical path of the imaging system; and
   a fixed correction optic configured to be positioned in the optical path of the imaging system;
   and wherein the fixed correction optic is configured to substantially mitigate an astigmatism caused by a combination of the optical filter and the dynamic correction optic.

2. The imaging system of claim 1, further comprising a telecentric tube lens configured to be positioned in the optical path of the imaging system.

3. The imaging system of claim 1, wherein any residual astigmatism caused by a combination of the fixed correction optic, the dynamic correction optic, and the optical filter is approximately zero (0).

4. The imaging system of claim 1, wherein for a selected first angle of incidence of the optical filter, the dynamic correction optic is configured to be tilted to a second angle of incidence, and wherein an angle of incidence of the fixed correction optic is configured to create an astigmatism to substantially mitigate an astigmatism caused by a combination of the optical filter at the selected first angle of incidence and the dynamic correction optic at the second angle of incidence.

5. The imaging system of claim 1, wherein the dynamic correction optic is configured to substantially stabilize a lateral image shift caused by a tilting of the optical filter.

6. The imaging system of claim 5, wherein a sum of a lateral image shift caused by the dynamic correction optic and the lateral image shift caused by a tilting of the optical filter is approximately constant.

7. The imaging system of claim 5, wherein for a selected first angle of incidence of the optical filter, the dynamic correction optic is configured to be tilted to a second angle of incidence, and wherein a sum of a lateral image shift caused by the dynamic correction optic and the lateral image shift caused by the optical filter is approximately constant.

8. The imaging system of claim 1, wherein the optical filter held by the at least one tiltable filter assembly, and the dynamic correction optic, are configured to tilt on approximately parallel X-axes, and wherein the fixed correction optic is tilted on a substantially perpendicular Y-axis.

9. The imaging system of claim 2, wherein the telecentric tube lens is located in the optical path of the imaging system at a position where the telecentric tube lens is telecentric in both image and object space.

10. The imaging system of claim 1 further comprising a filter changer configured to hold the at least one tiltable filter assembly.

11. The imaging system of claim 10, wherein the filter changer is a filter wheel, and wherein the at least one tiltable filter assembly is configured to tilt the optical filter to an angle of incidence selected from a range of approximately 0° to 89.9°.

12. The imaging system of claim 10, wherein the filter changer comprises at least 2, 3, 4, 5, 6, 7, 8, 9, 10, 11, 12, 13, 14, 15, 16, 17, 18, 19 or 20 tiltable filter assemblies.

13. The imaging system of claim 1 further comprising a low incidence filter selected from at least one of the group consisting of a dichroic filter, a polychroic filter, a shortpass filter, a longpass filter, a bandpass filter, a bandstop filter, and a multi-pass filter, wherein the low incidence filter is configured to have an angle of incidence with an excitation light selected from an angle ranging from approximately 10.0° to 30.0°.

14. The imaging system of claim 13, wherein the low incidence filter is a polychroic filter.

15. The imaging system of claim 1, wherein the imaging system is a fluorescence microscope imaging system.

16. The imaging system of claim 1, wherein the optical filter is an interference filter.

17. The imaging system of claim 1, wherein the at least one tiltable filter assembly is configured to tilt the optical filter to an angle of incidence selected from a range of approximately 0° to 89.9°.

18. A method of mitigating astigmatism in an imaging system, the method comprising:
   positioning an optical filter in an optical path of the imaging system at a first angle of incidence;
   positioning a dynamic correction optic in the optical path of the imaging system at a second angle of incidence;
   positioning a fixed correction optic in the optical path of the imaging system at a third angle of incidence,
   wherein the angle of incidence of the fixed correction optic is configured to create an astigmatism to substantially mitigate an astigmatism caused by a combination of the optical filter at the first angle of incidence, and the dynamic correction optic at the second angle of incidence.

19. A method of stabilizing a lateral image shift in an imaging system, the method comprising:

positioning a telecentric tube lens in the optical path of the imaging system;

positioning an optical filter in an optical path of the imaging system at a first angle of incidence;

positioning a dynamic correction optic in the optical path of the imaging system at a second angle of incidence; wherein the dynamic correction optic is configured to substantially stabilize a lateral image shift caused by a tilting of the optical filter.

* * * * *